(12) United States Patent
Tanaka et al.

(10) Patent No.: US 10,415,860 B2
(45) Date of Patent: Sep. 17, 2019

(54) AIR-CONDITIONING APPARATUS

(71) Applicant: Mitsubishi Electric Corporation, Tokyo (JP)

(72) Inventors: Kosuke Tanaka, Tokyo (JP); Takuya Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 61 days.

(21) Appl. No.: 15/750,332

(22) PCT Filed: Sep. 9, 2015

(86) PCT No.: PCT/JP2015/075618
§ 371 (c)(1),
(2) Date: Feb. 5, 2018

(87) PCT Pub. No.: WO2017/042912
PCT Pub. Date: Mar. 16, 2017

(65) Prior Publication Data
US 2018/0231287 A1    Aug. 16, 2018

(51) Int. Cl.
*F25B 47/02* (2006.01)
*F25B 1/00* (2006.01)
(Continued)

(52) U.S. Cl.
CPC ............ *F25B 47/022* (2013.01); *F16K 11/00* (2013.01); *F25B 1/00* (2013.01); *F25B 13/00* (2013.01);
(Continued)

(58) Field of Classification Search
CPC ........ F25B 47/022; F25B 13/00; F25B 30/02; F25B 41/04; F25B 41/00; F25B 1/00;
(Continued)

(56) References Cited

U.S. PATENT DOCUMENTS 4,305,417 A * 12/1981 Bell, Jr. ................ F25B 39/028
137/119.03
4,389,851 A * 6/1983 Chrostowski ........... F25B 13/00
62/155

(Continued)

FOREIGN PATENT DOCUMENTS

| JP | 61-079956 A | 4/1986 |
| JP | 2008064381 A * | 3/2008 |
| JP | 4272224 B2 | 6/2009 |

OTHER PUBLICATIONS

International Search Report of the International Searching Authority dated Dec. 15, 2015 for the corresponding international application No. PCT/JP2015/075618 (and English translation).

*Primary Examiner* — Emmanuel E Duke
(74) *Attorney, Agent, or Firm* — Posz Law Group, PLC

(57) ABSTRACT

Provided is an air-conditioning apparatus including a switching valve and a bypass circuit. The switching valve is provided between an expansion valve and an outdoor heat exchanger. The bypass circuit has a first end connected to a refrigerant pipe connecting a compressor and an indoor heat exchanger to each other, and a second end connected to the switching valve. During a heating operation, the air-conditioning apparatus causes a rotating member of the switching valve to rotate to sequentially connect, to the bypass circuit, flow passages of the outdoor heat exchanger connected in parallel, to thereby defrost the outdoor heat exchanger while performing the heating operation.

14 Claims, 12 Drawing Sheets

(51) Int. Cl.
 F25B 41/00 (2006.01)
 F25B 30/02 (2006.01)
 F25B 41/04 (2006.01)
 F16K 11/00 (2006.01)
 F25B 13/00 (2006.01)

(52) U.S. Cl.
 CPC .............. *F25B 30/02* (2013.01); *F25B 41/00* (2013.01); *F25B 41/04* (2013.01); *F25B 47/02* (2013.01); *F25B 2313/0211* (2013.01); *F25B 2313/0251* (2013.01); *F25B 2313/0253* (2013.01); *F25B 2600/2507* (2013.01); *F25B 2600/2511* (2013.01)

(58) Field of Classification Search
 CPC .............. F25B 47/02; F25B 2600/2511; F25B 2600/2507; F25B 2313/0253; F25B 2313/0251; F25B 2313/0211; F25B 41/062; F25B 27/02; F25B 29/003; F25B 49/02; F16K 11/00
 See application file for complete search history.

(56) References Cited

U.S. PATENT DOCUMENTS

| | | | |
|---|---|---|---|
| 5,794,452 A * | 8/1998 | Black ................... | F25B 41/04 62/278 |
| 6,381,974 B1 * | 5/2002 | Hwang .................. | F25B 13/00 165/286 |
| 7,004,246 B2 * | 2/2006 | Gavula .................. | F25B 13/00 165/267 |
| 8,794,028 B2 * | 8/2014 | Petersen ............... | F25B 39/028 62/524 |
| 2015/0083383 A1 * | 3/2015 | Okazaki ................ | F28F 9/26 165/173 |

* cited by examiner

AIR-CONDITIONING APPARATUS

CROSS REFERENCE TO RELATED APPLICATION

This application is a U.S. national stage application of PCT/JP2015/075618 filed on Sep. 9, 2015, the contents of which are incorporated herein by reference.

TECHNICAL FIELD

The present invention relates to an air-conditioning apparatus configured to simultaneously perform a heating operation and defrosting of an outdoor heat exchanger.

BACKGROUND ART

When a heating operation is performed in an air-conditioning apparatus, outside air with a high humidity causes frost formation in an outdoor heat exchanger. When frost formation occurs, a ventilation passage of the outdoor heat exchanger is narrowed, with the result that a flow rate of the outside air circulating through the outdoor heat exchanger is reduced. When the flow rate of the circulating outside air is reduced, a heat exchange amount is reduced. To compensate for the reduction of the heat exchange amount, correspondingly, an evaporation temperature of refrigerant flowing through the outdoor heat exchanger is lowered. When the evaporation temperature of the refrigerant is lowered, a surface temperature on the outside air side of the outdoor heat exchanger is also lowered, and frost formation is more liable to occur, with the result that frost formation becomes significant. When the situation remains unchanged, an amount of heat received by the outdoor heat exchanger from the outside air is reduced, and consequently, an amount of heat rejected from the indoor heat exchanger is also reduced. For this reason, in a related-art air-conditioning apparatus, when frost formation occurs in the outdoor heat exchanger, defrosting of the outdoor heat exchanger is performed.

As such a related-art air-conditioning apparatus configured to perform the defrosting of the outdoor heat exchanger, there has also been proposed an air-conditioning apparatus configured to perform the defrosting of the outdoor heat exchanger while performing the heating operation to prevent degradation in comfort in a room due to stoppage of the heating operation during the defrosting operation (see, for example, Patent Literature 1 and Patent Literature 2). Specifically, in the air-conditioning apparatus described in Patent Literature 1 and Patent Literature 2, an outdoor heat exchanger is constructed by a plurality of flow passages that are connected in parallel. Further, the air-conditioning apparatus described in Patent Literature 1 and Patent Literature 2 are configured to perform the defrosting of the outdoor heat exchanger while performing the heating operation in the following manner. During the heating operation, high-temperature gas refrigerant discharged from the compressor is caused to flow through a part of the flow passages, and the flow passage through which the high-temperature gas refrigerant discharged from the compressor is caused to flow is sequentially switched.

CITATION LIST

Patent Literature

Patent Literature 1: Japanese Unexamined Patent Application Publication No. 61-079956
Patent Literature 2: Japanese Patent No. 4272224

SUMMARY OF INVENTION

Technical Problem

The air-conditioning apparatus described in Patent Literature 1 has a configuration in which low-temperature refrigerant decompressed in an expansion valve flows into all of the flow passages of the outdoor heat exchanger during the heating operation. Consequently, in the air-conditioning apparatus described in Patent Literature 1, when the high-temperature gas refrigerant discharged from the compressor is supplied to a part of the flow passages of the outdoor heat exchanger to defrost a part of the outdoor heat exchanger, the high-temperature gas refrigerant discharged from the compressor and the low-temperature refrigerant decompressed in the expansion valve mix with each other, and then the mixed refrigerant is supplied to a part of the flow passages of the outdoor heat exchanger. Consequently, in the air-conditioning apparatus described in Patent Literature 1, there has been a problem in that a defrosting time period is prolonged due to lowering of a temperature of the refrigerant supplied to a part of the flow passages of the outdoor heat exchanger to perform the defrosting.

Meanwhile, the air-conditioning apparatus described in Patent Literature 2 has a configuration in which, when the high-temperature gas refrigerant discharged from the compressor is supplied to a part of the flow passages of the outdoor heat exchanger to defrost a part of the outdoor heat exchanger, connection destinations of the flow passages are switched with use of a plurality of solenoid valves to prevent the low-temperature refrigerant decompressed in the expansion valve from flowing into the flow passages. Consequently, the air-conditioning apparatus described in Patent Literature 2 can prevent such a situation in which the defrosting time period is prolonged due to lowering of the temperature of the refrigerant supplied to a part of the flow passages of the outdoor heat exchanger to perform the defrosting. However, in the air-conditioning apparatus described in Patent Literature 2, there has been the following problem. Specifically, the plurality of solenoid valves are needed to switch the connection destinations of the flow passages of the outdoor heat exchanger. Thus, an outdoor unit of the air-conditioning apparatus is increased in size, and an installation space for the outdoor unit is increased, accordingly.

The present invention has been made to solve the problems described above, and has an object to provide an air-conditioning apparatus configured to perform defrosting of an outdoor heat exchanger while performing a heating operation, and configured to prevent prolonging a defrosting time period and increase in installation space for an outdoor unit.

Solution to Problem

According to one embodiment of the present invention, provided is an air-conditioning apparatus including a refrigeration cycle circuit including a compressor, an indoor heat exchanger configured to serve as a condenser, an expansion valve, and an outdoor heat exchanger configured to serve as an evaporator, a switching valve provided between the expansion valve and the outdoor heat exchanger, and a bypass circuit having a first end and a second end, the first end being connected between the compressor and the indoor heat exchanger, the second end being connected to the switching valve, the outdoor heat exchanger including a first flow passage and a second flow passage connected in parallel between the expansion valve and a suction side of the compressor, the switching valve including a body, a rotating member, a first inlet provided to the body, and communicating with the expansion valve, a second inlet provided to the rotating member, and communicating with the second end of the bypass circuit, a first outlet provided to the body, and communicating with the first flow passage, and a second outlet provided to the body, and communicating with the second flow passage, the rotating member being rotatable between a plurality of angular positions, the plurality of angular positions including a first angular position allowing the first inlet to communicate with the second outlet, and allowing the second inlet to communicate with the first outlet, a second angular position allowing the first inlet to communicate with the first outlet, and allowing the second inlet to communicate with the second outlet, and a third angular position allowing the first inlet to communicate with both of the first outlet and the second outlet.

Further, an air-conditioning apparatus according to one embodiment of the present invention includes a refrigeration cycle circuit including a compressor, an indoor heat exchanger configured to serve as a condenser, an expansion valve, and an outdoor heat exchanger configured to serve as an evaporator, a switching valve provided between the expansion valve and the outdoor heat exchanger, and a bypass circuit having a first end and a second end, the first end being connected between the compressor and the indoor heat exchanger, the second end being connected to the switching valve, the outdoor heat exchanger including a first flow passage and a second flow passage connected in parallel between the expansion valve and a suction side of the compressor, the switching valve including a body, a rotating member, a first inlet provided to the rotating member, and communicating with the expansion valve, a second inlet provided to the body, and communicating with the second end of the bypass circuit, a first outlet provided to the body, and communicating with the first flow passage, and a second outlet provided to the body, and communicating with the second flow passage, the rotating member being rotatable between a plurality of angular positions, the plurality of angular positions including a first angular position allowing the first inlet to communicate with the second outlet, and allowing the second inlet to communicate with the first outlet, a second angular position allowing the first inlet to communicate with the first outlet, and allowing the second inlet to communicate with the second outlet, and a third angular position allowing the first inlet to communicate with both of the first outlet and the second outlet.

Advantageous Effects of Invention

In the air-conditioning apparatus according to one embodiment of the present invention, during the heating operation, through the switching of the switching valve, the high-temperature refrigerant discharged from the compressor can be sequentially supplied to the first flow passage and the second flow passage of the outdoor heat exchanger, and hence the air-conditioning apparatus can perform the defrosting of the outdoor heat exchanger while performing the heating operation. At this time, in the air-conditioning apparatus according to one embodiment of the present invention, connection destinations of the first flow passage and the second flow passage on the refrigerant inflow side can be switched to one of the discharge side of the compressor and the expansion valve side with use of one switching valve. That is, the air-conditioning apparatus according to one embodiment of the present invention can prevent, with use of the one switching valve, such a situation in which the defrosting time period is prolonged due to lowering of the temperature of the refrigerant supplied to a part of the flow passages of the outdoor heat exchanger to perform the defrosting. Consequently, the air-conditioning apparatus according to one embodiment of the present invention can also prevent the increase in size of the outdoor unit, and, can also prevent the increase in installation space for the outdoor unit, accordingly.

DESCRIPTION OF EMBODIMENTS

Embodiment 1

Figure 1:
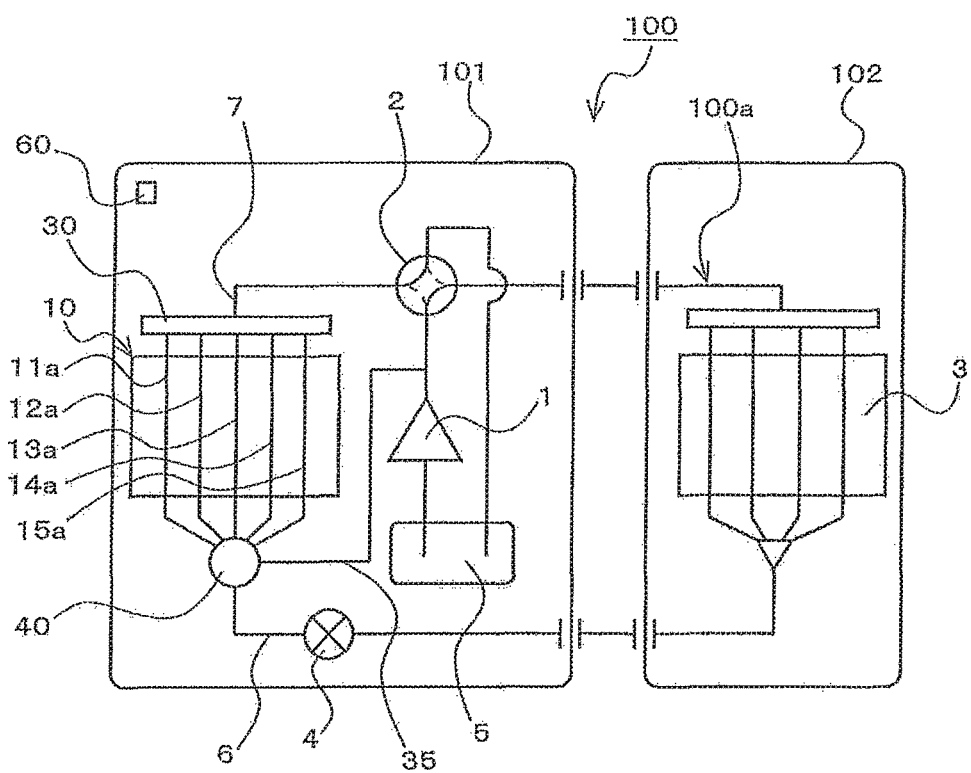
FIG. 1 is a refrigerant circuit diagram for illustrating an air-conditioning apparatus according to Embodiment 1 of the present invention.
Figure 2:
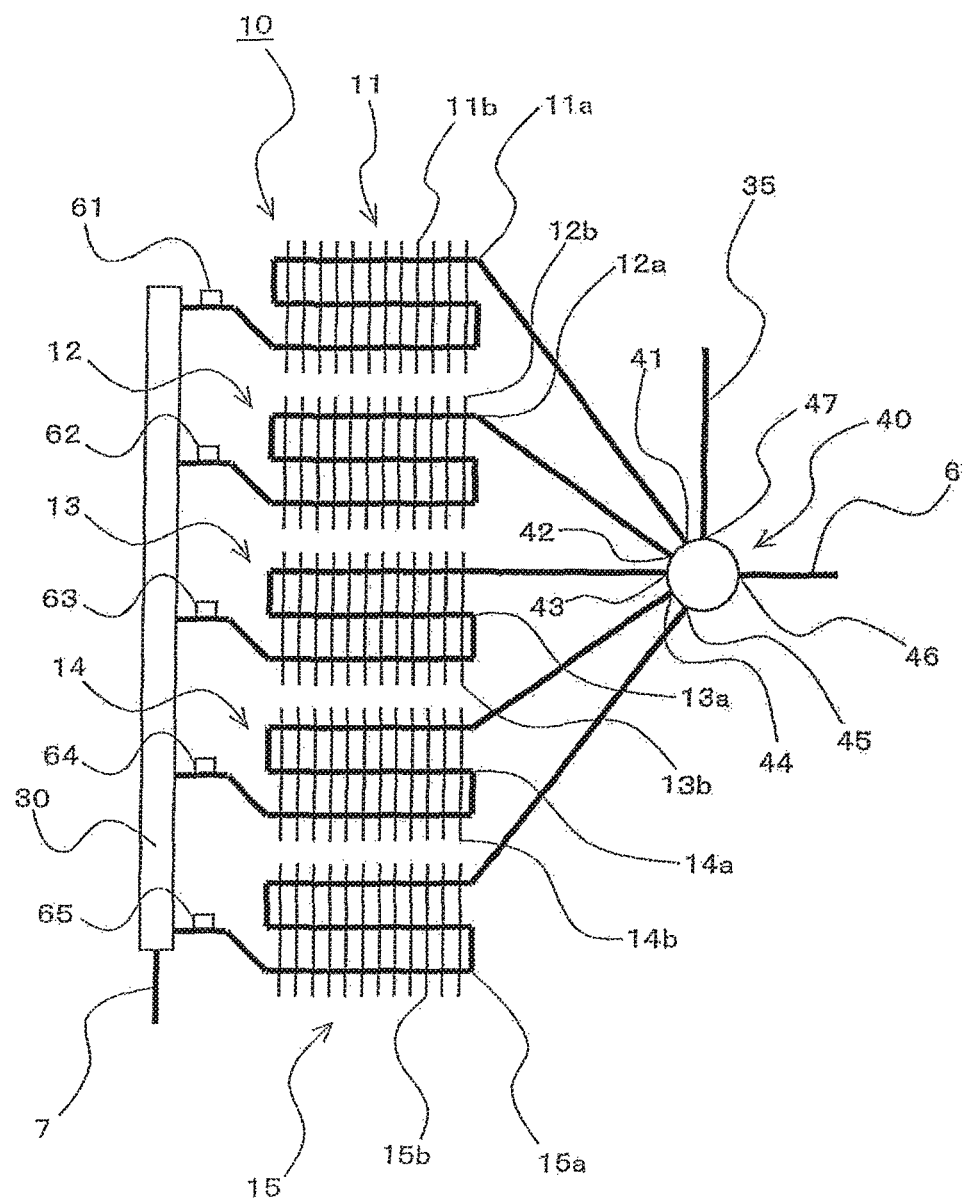
FIG. 2 is a refrigerant circuit diagram for illustrating the vicinity of an outdoor heat exchanger of the air-conditioning apparatus according to Embodiment 1 of the present invention.
Figure 3:
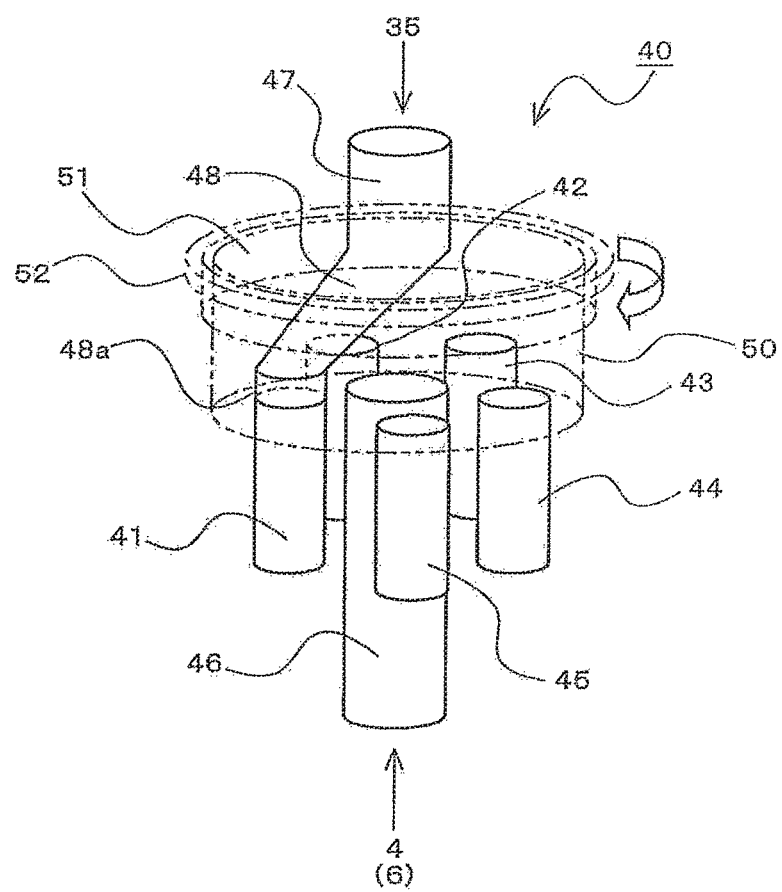
FIG. 3 is a perspective view for illustrating a switching valve of the air-conditioning apparatus according to Embodiment 1 of the present invention.
Figure 4:
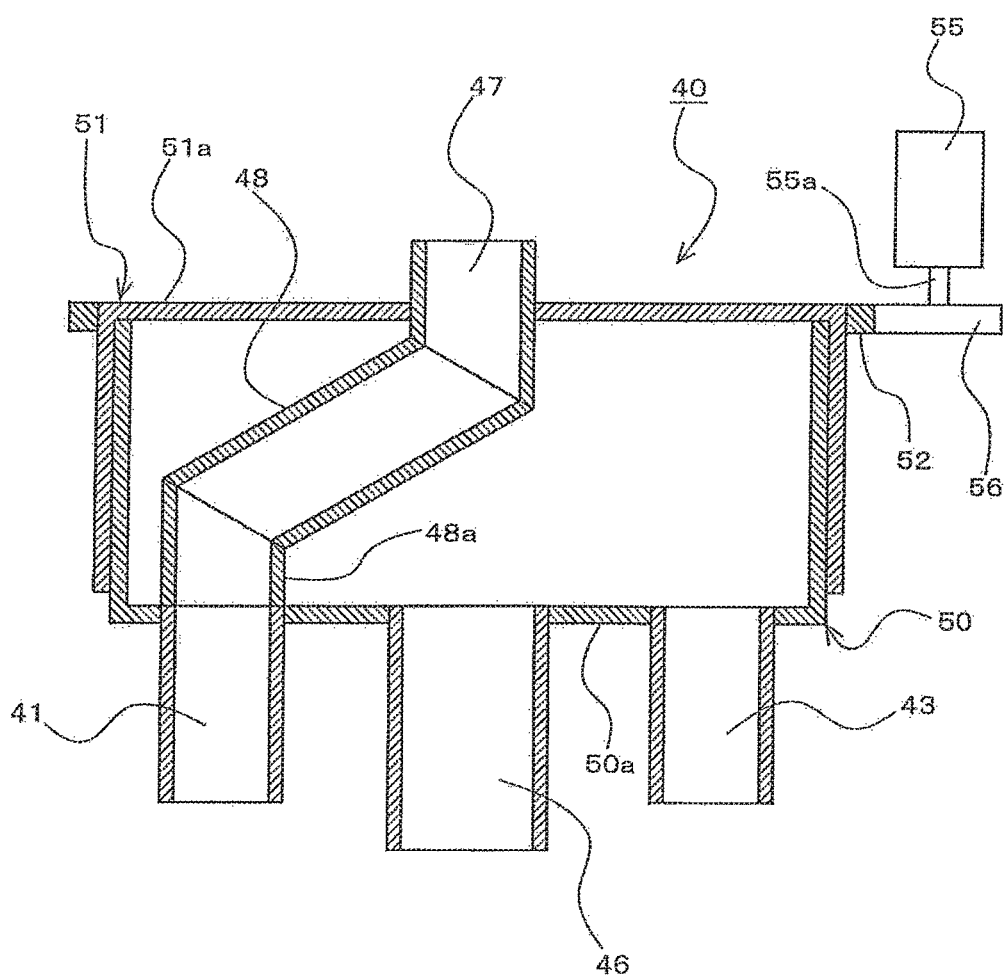
FIG. 4 is a vertical sectional view for illustrating the switching valve of the air-conditioning apparatus according to Embodiment 1 of the present invention.
Figure 5:
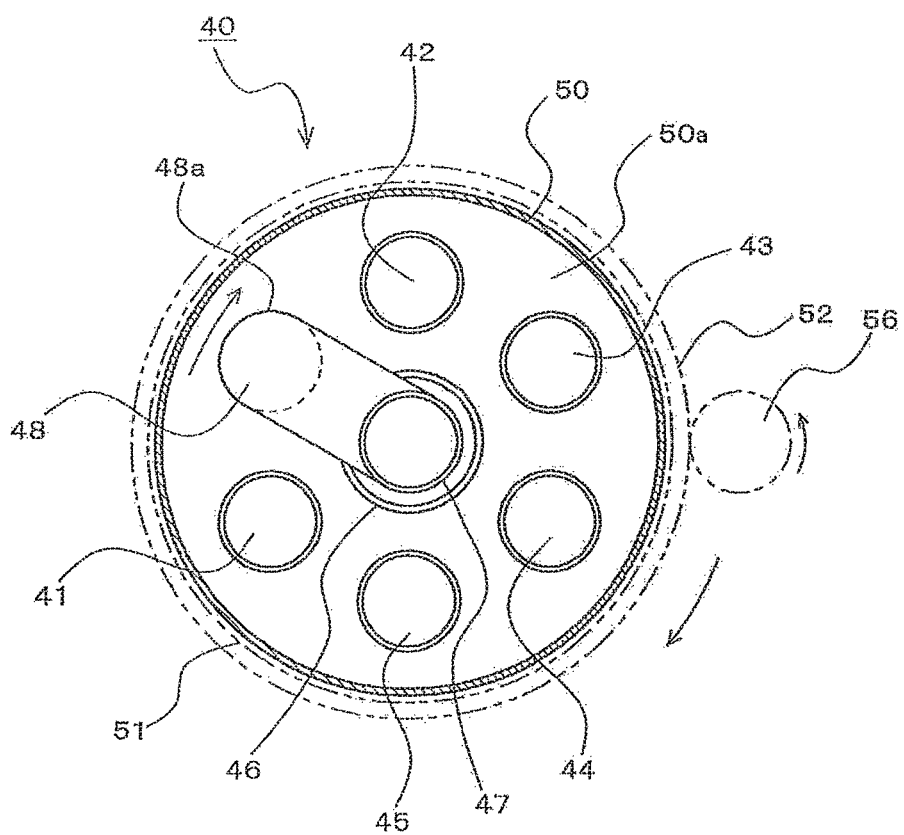
FIG. 5 is a plan view for illustrating the switching valve of the air-conditioning apparatus according to Embodiment 1 of the present invention.
Figure 6:
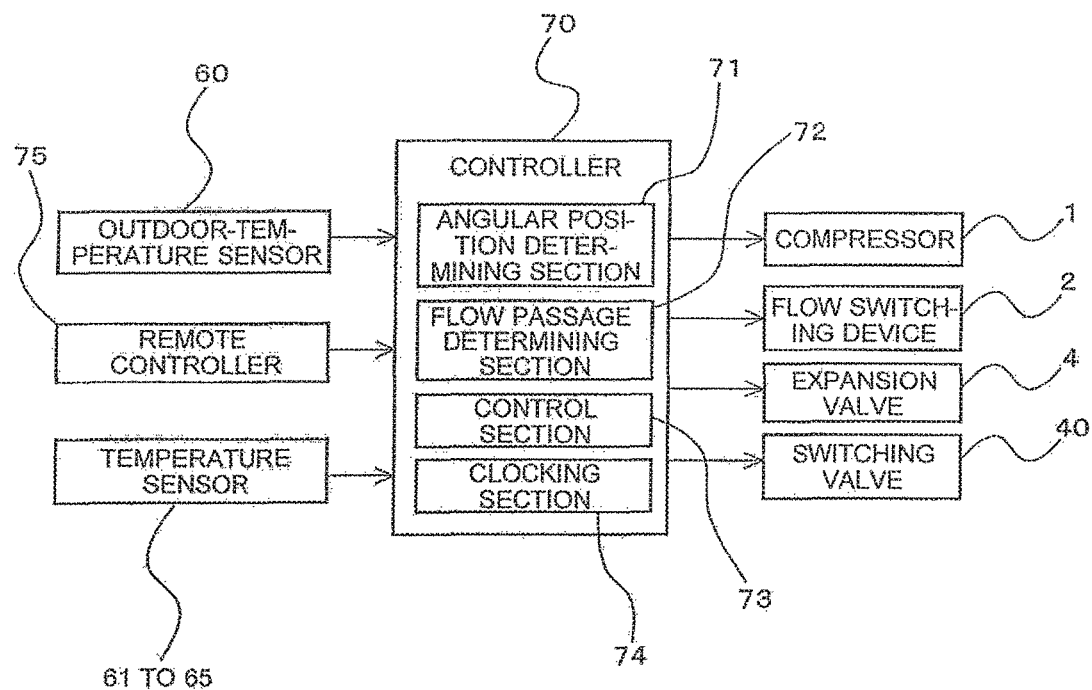
FIG. 6 is a hardware configuration diagram and a functional block diagram of the air-conditioning apparatus according to Embodiment 1 of the present invention.

FIG. 1 is a refrigerant circuit diagram for illustrating an air-conditioning apparatus according to Embodiment 1 of the present invention. FIG. 2 is a refrigerant circuit diagram for illustrating the vicinity of an outdoor heat exchanger of the air-conditioning apparatus. FIG. 3 is a perspective view for illustrating a switching valve of the air-conditioning apparatus. FIG. 4 is a vertical sectional view for illustrating the switching valve of the air-conditioning apparatus. FIG. 5 is a plan view for illustrating the switching valve of the air-conditioning apparatus. Further, FIG. 6 is a hardware configuration diagram and a functional block diagram of the air-conditioning apparatus.

In FIG. 3 and FIG. 5, for easy understanding of an internal structure of a switching valve 40, a part of the switching valve 40 is illustrated in a transparent manner.

An air-conditioning apparatus 100 according to Embodiment 1 includes a refrigeration cycle circuit 100a including a compressor 1, an indoor heat exchanger 3, an expansion valve 4, and an outdoor heat exchanger 10. That is, the air-conditioning apparatus 100 includes the refrigeration cycle circuit 100a capable of performing a heating operation with the indoor heat exchanger 3 serving as a condenser and the outdoor heat exchanger 10 serving as an evaporator. Further, the air-conditioning apparatus 100 includes the switching valve 40 provided between the expansion valve 4 and the outdoor heat exchanger 10. Further, the air-conditioning apparatus 100 includes a bypass circuit 35 having a first end and a second end. The first end of the bypass circuit 35 is connected between the compressor 1 and the indoor heat exchanger 3, that is, to a discharge side of the compressor 1. In Embodiment 1, the first end of the bypass circuit 35 is connected to a pipe 6 connecting the compressor 1 and the indoor heat exchanger 3 to each other. The second end of the bypass circuit 35 is connected to the switching valve 40.

The compressor 1 sucks refrigerant and compresses the refrigerant into high-temperature and high-pressure gas refrigerant. The type of the compressor 1 is not particularly limited, and the compressor 1 may be constructed by compression mechanisms of various types such as a reciprocating type, a rotary type, a scroll type, and a screw type. It is preferred that the compressor 1 be constructed by a compression mechanism of a type in which a rotation frequency can be variably controlled by an inverter.

The indoor heat exchanger 3 is, for example, a fin-and-tube air heat exchanger configured to exchange heat between refrigerant flowing through the indoor heat exchanger 3 and indoor air. When the indoor heat exchanger 3 of the air heat exchanger is used as a use-side heat exchanger, it is preferred that an indoor fan configured to supply indoor air, which is an object with which heat is exchanged, to the indoor heat exchanger 3 be provided in a periphery of the indoor heat exchanger 3. The indoor heat exchanger 3 is connected to the discharge side of the compressor 1. The indoor heat exchanger 3 is not limited to the air heat exchanger. The type of the indoor heat exchanger 3 may suitably be selected corresponding to an object with which the refrigerant exchanges heat. When water or brine is an object with which heat is exchanged, the indoor heat exchanger 3 may be constructed by a water heat exchanger. That is, the water or the brine having exchanged heat with the refrigerant in the indoor heat exchanger 3 may be supplied to an indoor side, and heating may be performed using the water or the brine supplied to the indoor side.

The expansion valve 4 is configured to expand the refrigerant by decompressing the refrigerant.

The outdoor heat exchanger 10 is, for example, a fin-and-tube air heat exchanger configured to exchange heat between refrigerant flowing through the outdoor heat exchanger 10 and outside air. The outdoor heat exchanger 10 includes a plurality of flow passages connected in parallel between the expansion valve 4 and a suction side of the compressor 1. In Embodiment 1, the outdoor heat exchanger 10 including five flow passages 11a to 15a connected in parallel is described as an example.

As illustrated in FIG. 2, in the outdoor heat exchanger 10 of Embodiment 1, the flow passages 11a to 15a are constructed as fin-and-tube heat exchangers provided separately from each other. Specifically, a heat exchanger 11 includes a plurality of fins 11b arrayed at predefined pitch intervals, and the flow passage 11a that is a heat transfer pipe provided to pass through the plurality of fins 11b. A heat exchanger 12 includes a plurality of fins 12b arrayed at predefined pitch intervals, and the flow passage 12a that is a heat transfer pipe provided to pass through the plurality of fins 12b. A heat exchanger 13 includes a plurality of fins 13b arrayed at predefined pitch intervals, and the flow passage 13a that is a heat transfer pipe provided to pass through the plurality of fins 13b. A heat exchanger 14 includes a plurality of fins 14b arrayed at predefined pitch intervals, and the flow passage 14a that is a heat transfer pipe provided to pass through the plurality of fins 14b. A heat exchanger 15 includes a plurality of fins 15b arrayed at predefined pitch intervals, and the flow passage 15a that is a heat transfer pipe provided to pass through the plurality of fins 15b.

These heat exchangers 11 to 15 are connected in parallel, thereby constructing the outdoor heat exchanger 10. Further, the outdoor heat exchanger 10 has a configuration in which the heat exchangers 11 to 15 are arrayed in a direction from an upper side to a lower side. In other words, the outdoor heat exchanger 10 has a configuration in which the flow passages 11a to 15a are arrayed in the direction from the upper side to the lower side.

In the outdoor heat exchanger 10 constructed as described above, ends of the flow passages 11a to 15a on the expansion valve 4 side are connected to the switching valve 40. Further, ends of the flow passages 11a to 15a on a side opposite to the expansion valve 4 are connected to a header 30. The header 30 is connected to the suction side of the compressor 1 by a pipe 7.

As illustrated in FIG. 3 to FIG. 5, the switching valve 40 includes a body 50, and a rotating member 51 provided to be rotatable against the body 50. The body 50 has, for example, a cylindrical shape in which a lower portion 50a is closed and an upper portion is opened. A first inlet 46 and outlets 41 to 45 are provided to the body 50. The number of the outlets 41 to 45 corresponds to the number of the flow passages 11a to 15a. In Embodiment 1, the first inlet 46 and the outlets 41 to 45 are provided to the lower portion 50a of the body 50. Further, in Embodiment 1, pipes are provided to communicate with an inside of the body 50, to form the first inlet 46 and the outlets 41 to 45 provided to the lower portion 50a of the body 50. Further, the outlets 41 to 45 are arranged on an imaginary circle in plan view.

As illustrated in FIG. 1 and FIG. 2, the first inlet 46 communicates with the expansion valve 4 through the pipe 6. The outlet 41 communicates with the flow passage 11a of the outdoor heat exchanger 10. The outlet 42 communicates with the flow passage 12a of the outdoor heat exchanger 10.

The outlet 43 communicates with the flow passage 13a of the outdoor heat exchanger 10. The outlet 44 communicates with the flow passage 14a of the outdoor heat exchanger 10. Further, the outlet 45 communicates with the flow passage 15a of the outdoor heat exchanger 10.

With reference back to FIG. 3 to FIG. 5, the rotating member 51 has, for example, a cylindrical shape in which an upper portion 51a is closed and the lower portion is opened. The rotating member 51 is mounted to the body 50 to close the upper opening of the body 50. Further, the rotating member 51 includes a gear 52 on an outer peripheral portion. The gear 52 meshes with a gear 56 mounted to a rotation shaft 55a of a motor 55. When a drive force of the motor 55 is transmitted to the rotating member 51 through the gear 56 and the gear 52, the rotating member 51 is rotated up to angular positions described later with the center of the imaginary circle on which the outlets 41 to 45 are arranged as a rotation center in plan view.

A second inlet 47 is provided to the rotating member 51. In Embodiment 1, the second inlet 47 is provided to the upper portion 51a of the rotating member 51. Further, the second inlet 47 is arranged at the center of the imaginary circle on which the outlets 41 to 45 are arranged in plan view. In Embodiment 1, a pipe is provided to communicate with the inside of the rotating member 51, to form the second inlet 47. As illustrated in FIG. 1 and FIG. 2, the second inlet 47 communicates with the bypass circuit 35.

A connection pipe 48 having, for example, an L-shape or a Z-shape in side view is connected to the second inlet 47. An end 48a of the connection pipe 48 on a side opposite to an end of the connection pipe 48 on a side connected to the second inlet 47 is arranged to be opposed to the lower portion 50a of the body 50. Further, the end 48a of the connection pipe 48 is positioned to move over the imaginary circle on which the outlets 41 to 45 are arranged in plan view when the connection pipe 48 is rotated together with the rotating member 51.

In the switching valve 40 constructed as described above, when the rotating member 51 is rotated, so that the end 48a of the connection pipe 48 is brought to an angular position opposed to any one of the outlets 41 to 45 in plan view, an outlet opposed to the end 48a and the second inlet 47 communicate with each other. Further, outlets that are not opposed to the end 48a and the first inlet 46 communicate with each other through an internal space of the body 50. For example, as illustrated in FIG. 3, when the end 48a of the connection pipe 48 and the outlet 41 are opposed to each other, the rotating member 51 takes an angular position that allows the second inlet 47 and the outlet 41 to communicate with each other and that allows the first inlet 46 and the outlets 42 to 45 to communicate with each other.

Further, as illustrated in FIG. 5, when the rotating member 51 takes an angular position at which the end 48a of the connection pipe 48 is not opposed to any of the outlets 41 to 45 in plan view, the end 48a of the connection pipe 48 is closed by the lower portion 50a of the body 50. That is, a flow passage from the discharge side of the compressor 1 to the outdoor heat exchanger 10, which is constructed by the bypass circuit 35 and the switching valve 40, is closed by the lower portion 50a of the body 50. At this time, all of the outlets 41 to 45 communicate with the first inlet 46 through the internal space of the body 50.

That is, the switching valve 40 has a configuration in which outlets that communicate with the first inlet 46 and the second inlet 47 are switched as a result of the change in angular position through the rotation of the rotating member 51.

To achieve a cooling operation with the outdoor heat exchanger 10 serving as a condenser and the indoor heat exchanger 3 serving as an evaporator, in the air-conditioning apparatus 100 according to Embodiment 1, for example, a flow switching device 2 that is a four-way valve is provided in the refrigeration cycle circuit 100a. The flow switching device 2 is provided on the discharge side of the compressor 1. The flow switching device 2 switches a flow passage to one of a flow passage connecting the discharge side of the compressor 1 and the indoor heat exchanger 3 to each other (third flow passage of the present invention) and a flow passage connecting the discharge side of the compressor 1 and the outdoor heat exchanger 10 to each other (fourth flow passage of the present invention). In the refrigeration cycle circuit 100a, the discharge side of the compressor 1 and the outdoor heat exchanger 10 are connected to each other, and the suction side of the compressor 1 and the indoor heat exchanger 3 are connected to each other. In this manner, the compressor 1, the outdoor heat exchanger 10, the expansion valve 4, and the indoor heat exchanger 3 are sequentially connected to one another by refrigerant pipes. With this configuration, the air-conditioning apparatus 100 can perform the cooling operation as well as the heating operation.

Further, in the air-conditioning apparatus 100, an accumulator 5 that is configured to accumulate surplus refrigerant is provided at a position between the outdoor heat exchanger 10 and the suction side of the compressor 1 during the heating operation. When the surplus refrigerant is not generated, it is not necessary that the accumulator 5 be provided.

As illustrated in FIG. 1, the components of the air-conditioning apparatus 100 described above are accommodated in an outdoor unit 101 or an indoor unit 102. Specifically, the compressor 1, the flow switching device 2, the expansion valve 4, the switching valve 40, the outdoor heat exchanger 10, and the header 30 are accommodated in the outdoor unit 101. The indoor heat exchanger 3 is accommodated in the indoor unit 102.

Further, the air-conditioning apparatus 100 includes various sensors and a controller 70 configured to control drive devices such as a switching valve 40 on the basis of measurement values of these sensors.

Specifically, as illustrated in FIG. 1, in the air-conditioning apparatus 100, an outdoor-temperature sensor 60 configured to measure an outdoor temperature is provided to the outdoor unit 101. Further, as illustrated in FIG. 2, in the air-conditioning apparatus 100, temperature sensors 61 to 65 configured to measure temperatures of refrigerant flowing through the flow passages 11a to 15a are provided to the flow passages 11a to 15a of the outdoor heat exchanger 10, respectively. The temperature sensors 61 to 65 are each arranged at a position on a downstream side in a refrigerant flow during the heating operation, in other words, in the vicinity of an outlet. The outdoor-temperature sensor 60 and the temperature sensors 61 to 65 are each, for example, a thermistor. As illustrated in FIG. 6, the outdoor-temperature sensor 60 and the temperature sensors 61 to 65 are electrically connected to the controller 70, and the controller 70 is capable of acquiring the measurement values of the outdoor-temperature sensor 60 and the temperature sensors 61 to 65.

The controller 70 is constructed by dedicated hardware or a central processing unit (CPU) (which may also be referred to as a processing device, an arithmetic device, a microprocessor, a microcomputer, or a processor) configured to execute a program stored in a memory. The controller 70 is accommodated in, for example, the outdoor unit 101.

When the controller 70 is constructed by the dedicated hardware, the controller 70 corresponds to, for example, a single circuit, a composite circuit, an application specific integrated circuit (ASIC), a field-programmable gate array (FPGA), or a combination of these circuits. The functional sections implemented by the controller 70 may each be achieved by individual pieces of hardware, or a single piece of hardware may be used to achieve the functional sections.

When the controller 70 is constructed by the CPU, functions executed by the controller 70 are achieved by software, firmware, or a combination of software and firmware. The software or the firmware is described as a program and is stored in a memory. The CPU is configured to read out and execute the program stored in the memory, to thereby achieve the functions of the controller 70. The memory is, for example, a RAM, a ROM, a flash memory, an EPROM, an EEPROM, or other types of non-volatile or volatile semiconductor memory.

A part of the functions of the controller 70 may be achieved by the dedicated hardware, and another part of the functions of the controller 70 may be achieved by software or firmware.

As illustrated in FIG. 6, the controller 70 of Embodiment 1 includes, as function sections, an angular position determining section 71, a flow passage determining section 72, a control section 73, and a clocking section 74.

The angular position determining section 71 is configured to determine the angular position of the rotating member 51 of the switching valve 40 on the basis of, for example, the measurement values of the outdoor-temperature sensor 60 and the temperature sensors 61 to 65. That is, the angular position determining section 71 is configured to determine with which of the outlets 41 to 45 the first inlet 46 and the second inlet 47 of the switching valve 40 communicate.

The flow passage determining section 72 is configured to determine the flow passage of the flow switching device 2. The air-conditioning apparatus 100 according to Embodiment 1 includes a remote controller 75 capable of performing communication with the controller 70. For example, when a user selects the heating operation with use of the remote controller 75, the flow passage determining section 72 determines the flow passage of the flow switching device 2 to the flow passage connecting the discharge side of the compressor 1 and the indoor heat exchanger 3 to each other. That is, the flow passage determining section 72 determines the flow passage of the flow switching device 2 to the flow passage indicated by the solid line in FIG. 1. Further, for example, when a user selects the cooling operation with use of the remote controller 75, the flow passage determining section 72 determines the flow passage of the flow switching device 2 to the flow passage connecting the discharge side of the compressor 1 and the outdoor heat exchanger 10 to each other. That is, the flow passage determining section 72 determines the flow passage of the flow switching device 2 to the flow passage indicated by the broken line in FIG. 1.

The control section 73 controls the switching valve 40, in other words, controls the motor 55 to switch the angular position of the rotating member 51 of the switching valve 40 to the angular position determined by the angular position determining section 71. Further, the control section 73 controls the flow switching device 2 corresponding to a determination result of the flow passage determining section 72 to switch the flow passage of the flow switching device 2. Further, the control section 73 also controls activation, stop, and a rotation frequency of the compressor 1 and an opening degree of the expansion valve 4.

The clocking section 74 measures a drive time period of the compressor 1, for example.

DESCRIPTION OF OPERATION

Subsequently, operations of the air-conditioning apparatus 100 during the heating operation and the cooling operation are described.

(Heating Operation)

During the heating operation, the flow passage determining section 72 determines the flow passage of the flow switching device 2 to the flow passage connecting the discharge side of the compressor 1 and the indoor heat exchanger 3 to each other. Further, the angular position determining section 71 determines the angular position of the rotating member 51 of the switching valve 40 to the angular position that allows all of the outlets 41 to 45 to communicate with the first inlet 46. The control section 73 switches the flow switching device 2 and the switching valve 40 corresponding to determination results of the flow passage determining section 72 and the angular position determining section 71, and activates the compressor 1.

At the time of activation of the compressor 1, the refrigerant is sucked through the suction port of the compressor 1. Then, the refrigerant turns into high-temperature and high-pressure gas refrigerant, and is discharged through a discharge port of the compressor 1. The high-temperature and high-pressure gas refrigerant discharged from the compressor 1 flows into the indoor heat exchanger 3 through the flow switching device 2. Then, the high-temperature and high-pressure gas refrigerant flowing into the indoor heat exchanger 3 heats indoor air, is brought into a liquid state, and flows out from the indoor heat exchanger 3. The refrigerant flowing out from the indoor heat exchanger 3 flows into the expansion valve 4. The liquid-state refrigerant flowing into the expansion valve 4 is decompressed in the expansion valve 4, is brought into a low-temperature two-phase gas-liquid state, and flows out from the expansion valve 4.

The low-temperature two-phase gas-liquid refrigerant flowing out from the expansion valve 4 flows into the switching valve 40 through the pipe 6. Specifically, the low-temperature two-phase gas-liquid refrigerant flowing out from the expansion valve 4 flows into the body 50 through the first inlet 46. Then, the two-phase gas-liquid refrigerant flows out from each of the outlets 41 to 45 of the switching valve 40. At this time, in the switching valve 40 of Embodiment 1, the first inlet 46 and the outlets 41 to 45 are provided to the lower portion 50a of the body 50. Consequently, the two-phase gas-liquid refrigerant flowing into the body 50 through the first inlet 46 collides against the upper portion 51a of the rotating member 51, so that gas-phase refrigerant and liquid-phase refrigerant are mixed with each other, and then, flows out from each of the outlets 41 to 45. Consequently, the switching valve 40 of Embodiment 1 serves as a distributor, and can equalize the gas-liquid mixing ratio of the two-phase gas-liquid refrigerant flowing out from each of the outlets 41 to 45.

The low-temperature two-phase gas-liquid refrigerant flowing out from each of the outlets 41 to 45 of the switching valve 40 flows into a corresponding one of the flow passages 11a to 15a of the outdoor heat exchanger 10 that communicate with these outlets. The refrigerant flowing into each of the flow passages 11a to 15a of the outdoor heat exchanger 10 receives heat from outside air to be evaporated, and then flows out from each of the flow passages 11a to 15a as low-pressure gas refrigerant. The low-pressure gas refrigerant flowing out from the flow passages 11a to 15a of the outdoor heat exchanger 10 merge with each other at the header 30. Then, the refrigerant passes through the pipe 7, the flow switching device 2, and the accumulator 5, and is sucked into the compressor 1 again.

(Defrosting Operation)

During the heating operation, outside air with a high humidity causes frost formation in the outdoor heat exchanger 10. When frost formation occurs, a ventilation passage of the outdoor heat exchanger 10 is narrowed, with the result that the flow rate of the outside air circulating through the outdoor heat exchanger 10 is reduced. When the flow rate of the circulating outside air is reduced, a heat exchange amount is reduced. To compensate for the reduction of the heat exchange amount, correspondingly, an evaporation temperature of the refrigerant flowing through the outdoor heat exchanger 10 is lowered. When the evaporation temperature of the refrigerant is lowered, the surface temperature on the outside air side of the outdoor heat exchanger 10 is also lowered, and frost formation is more liable to occur, with the result that frost formation becomes significant. When the situation remains unchanged, an amount of heat received by the outdoor heat exchanger 10 from the outside air is reduced, and consequently, an amount of heat rejected from the indoor heat exchanger 3 is also reduced.

Consequently, when frost formation occurs in the outdoor heat exchanger 10, the air-conditioning apparatus 100 according to Embodiment 1 performs a defrosting operation for the outdoor heat exchanger 10. Determination of whether or not frost formation has occurred in the outdoor heat exchanger 10 may be performed by various publicly known configurations. For example, when a difference between the outdoor temperature and a temperature of the refrigerant flowing through the outdoor heat exchanger 10 is equal to or larger than a predefined value, it may be determined that frost formation has occurred in the outdoor heat exchanger 10. The outdoor temperature can be measured by the outdoor-temperature sensor 60. Further, as the temperature of the refrigerant flowing through the outdoor heat exchanger 10, any one of the measurement values of the temperature sensors 61 to 66 can be used. Further, a pressure sensor may be provided on the suction side of the compressor 1. A measurement value of the pressure sensor is converted into an evaporation temperature, which may be used as the temperature of the refrigerant flowing through the outdoor heat exchanger 10. Further, for example, when a drive time period of the compressor is equal to or longer than a predefined time period, it may be determined that frost formation has occurred in the outdoor heat exchanger 10. The determination of whether or not frost formation has occurred in the outdoor heat exchanger 10 is performed by the angular position determining section 71.

Specifically, when frost formation has occurred in the outdoor heat exchanger 10, the air-conditioning apparatus 100 according to Embodiment 1 performs the defrosting operation for the outdoor heat exchanger 10 as described below.

The angular position determining section 71 determines the angular position of the rotating member 51 of the switching valve 40 to an angular position that allows the second inlet 47 to communicate with any one of the outlets 41 to 45. Then, the control section 73 controls the switching valve 40 so that the rotating member 51 takes this angular position.

For example, a case is assumed in which the angular position determining section 71 determines the angular position of the rotating member 51 to the angular position that allows the second inlet 47 to communicate with the outlet 41. In this case, high-temperature gas refrigerant discharged from the compressor 1 passes through the bypass circuit 35 and flows into the switching valve 40 through the second inlet 47. Then, the high-temperature gas refrigerant flows out from the switching valve 40 through the outlet 41 and flows into the flow passage 11a of the outdoor heat exchanger 10, which communicates with the outlet 41. The high-temperature gas refrigerant flows through the flow passage 11a, and thus the flow passage 11a and a periphery of the flow passage 11a can be defrosted. In this case, in the switching valve 40 of Embodiment 1, the outlets 42 to 45 other than the outlet 41, that is, the outlets 42 to 45, which do not communicate with the second inlet 47, communicate with the first inlet 46. Consequently, the low-temperature low-pressure two-phase gas-liquid refrigerant flowing out from the expansion valve 4 flows into each of the flow passages 12a to 15a of the outdoor heat exchanger 10, which communicate with the outlets 42 to 45. That is, parts corresponding to the flow passages 12a to 15a of the outdoor heat exchanger 10, in other words, the heat exchangers 12 to 15 serve as evaporators. Consequently, the air-conditioning apparatus 100 according to Embodiment 1 can perform the defrosting while performing the heating operation.

Figure 7:
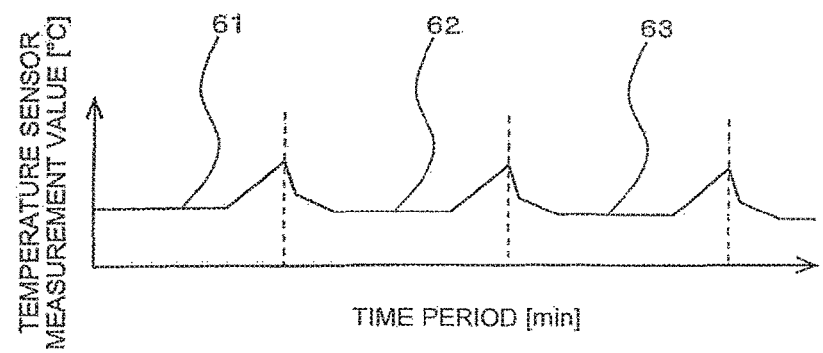
FIG. 7 is an explanatory graph for showing changes of measurement values of temperature sensors provided to flow passages of the outdoor heat exchanger under a state in which the air-conditioning apparatus according to Embodiment 1 of the present invention performs a defrosting operation.

FIG. 7 is an explanatory graph for showing changes of the measurement values of the temperature sensors provided to the flow passages of the outdoor heat exchanger under a state in which the air-conditioning apparatus according to Embodiment 1 of the present invention performs the defrosting operation.

When the high-temperature gas refrigerant is supplied to the flow passage 11a of the outdoor heat exchanger 10, and the defrosting of the flow passage 11a and the periphery of the flow passage 11a is started, the refrigerant is cooled in a process of melting frost adhering to the flow passage 11a and the periphery of the flow passage 11a. Consequently, until melting of the frost adhering to the flow passage 11a and the periphery of the flow passage 11a is completed, the measurement value of the temperature sensor 61 provided to the flow passage 11a remains constant at 0 degrees Celsius, which is equal to a temperature of the frost. Then, after melting of the frost adhering to the flow passage 11a and the periphery of the flow passage 11a is completed, the measurement value of the temperature sensor 61 provided to the flow passage 11a rises. Consequently, when the measurement value of the temperature sensor 61 is equal to or larger than a predefined value, the angular position determining section 71 determines that the melting of the frost adhering to the flow passage 11a and the periphery of the flow passage 11a is completed, and determines to shift the angular position of the rotating member 51 of the switching valve 40.

In this case, the predefined value corresponds to a first predefined value of the present invention. The predefined value is, for example, 5 degrees Celsius.

Specifically, when the measurement value of the temperature sensor 61 is equal to or larger than the predefined value, the angular position determining section 71 determines the angular position of the rotating member 51 of the switching valve 40 to an angular position at which any one of the outlets 42 to 45, which is not connected to the second inlet 47 during a current defrosting operation for the outdoor heat exchanger 10, and the second inlet 47 communicate with each other. Then, the control section 73 controls the switching valve 40 so that the rotating member 51 takes this angular position.

For example, a case is assumed in which the angular position determining section 71 determines the angular position of the rotating member 51 to an angular position that allows the second inlet 47 and the outlet 42 to communicate with each other. In this case, the high-temperature gas refrigerant discharged from the compressor 1 passes through the bypass circuit 35 and flows into the switching valve 40 through the second inlet 47. Then, the high-temperature gas refrigerant flows out from the switching valve 40 through the outlet 42 and flows into the flow passage 12a of the outdoor heat exchanger 10, which communicates with the outlet 42. The high-temperature gas refrigerant flows through the flow passage 12a, and thus the flow passage 12a and a periphery of the flow passage 12a can be defrosted. As described above, in the switching valve 40 of Embodiment 1, the outlet 41 and outlets 43 to 45, which do not communicate with the second inlet 47, communicate with the first inlet 46. Consequently, the low-temperature low-pressure two-phase gas-liquid refrigerant flowing out from the expansion valve 4 flows into each of the flow passage 11a and the flow passages 13a to 15a of the outdoor heat exchanger 10, which communicate with the outlet 41 and outlets 43 to 45. That is, parts corresponding to the flow passage 11a and the flow passages 13a to 15a of the outdoor heat exchanger 10, in other words, the heat exchanger 11 and the heat exchangers 13 to 15 serve as evaporators. Consequently, the air-conditioning apparatus 100 according to Embodiment 1 can perform the defrosting while performing the heating operation.

After the melting of the frost adhering to the flow passage 12a and the periphery of the flow passage 12a has been completed, as shown in FIG. 7, the measurement value of the temperature sensor 62 provided to the flow passage 12a rises. Consequently, when the measurement value of the temperature sensor 62 is equal to or larger than a predefined value, the angular position determining section 71 determines that the melting of the frost adhering to the flow passage 12a and the periphery of the flow passage 12a has been completed, and determines to shift the angular position of the rotating member 51 of the switching valve 40. Specifically, when the measurement value of the temperature sensor 62 is equal to or larger than the predefined value, the angular position determining section 71 determines the angular position of the rotating member 51 to an angular position at which any one of the outlets 43 to 45, which is not connected to the second inlet 47 during a current defrosting operation for the outdoor heat exchanger 10, and the second inlet 47 communicate with each other. Then, the control section 73 controls the switching valve 40 so that the rotating member 51 takes this angular position.

As described above, in the switching valve 40, an outlet to be connected to the second inlet 47 is sequentially switched so that the outdoor heat exchanger 10 can be defrosted while the heating operation is continuously performed.

In this case, any one of the flow passages 11a to 15a of the outdoor heat exchanger 10 corresponds to a first flow passage of the present invention. Further, any one of the flow passages 11a to 15a of the outdoor heat exchanger 10, excluding the first flow passage, corresponds to a second flow passage of the present invention. When the flow passages 11a to 15a are arrayed in an up-and-down direction as in Embodiment 1, among the flow passages 11a to 15a of the outdoor heat exchanger 10, a flow passage that is arranged in a position lower than the first flow passage, corresponds to the second flow passage of the present invention. For example, in FIG. 2, when the flow passage 14a is defined as the first flow passage, the flow passage 15a corresponds to the second flow passage.

Further, among the outlets 41 to 45 of the switching valve 40, an outlet that communicates with the first flow passage corresponds to a first outlet of the present invention. Among the outlets 41 to 45 of the switching valve 40, an outlet that communicates with the second flow passage corresponds to a second outlet of the present invention.

Further, an angular position that allows the first inlet 46 to communicate with the second outlet and allows the second inlet 47 to communicate with the first outlet corresponds to a first angular position of the present invention. An angular position that allows the first inlet 46 to communicate with the first outlet and allows the second inlet 47 to communicate with the second outlet corresponds to a second angular position of the present invention. An angular position that allows the first inlet 46 to communicate with both of the first outlet and the second outlet, in other words, an angular position that allows the first inlet 46 to communicate with all of the outlets corresponds to a third angular position of the present invention.

That is, during the defrosting operation for the outdoor heat exchanger 10, in a case in which the measurement value of the temperature sensor provided to the first flow passage is equal to or larger than the first predefined value while the rotating member 51 takes the first angular position, when a period in which the rotating member 51 takes the second angular position during the defrosting operation is not present, the angular position determining section 71 determines the angular position of the rotating member 51 to the second angular position. When a period in which the rotating member 51 has taken the second angular position during the defrosting operation is present, the angular position determining section 71 determines the angular position of the rotating member 51 to the third angular position. In a case in which the measurement value of the temperature sensor provided to the second flow passage is equal to or larger than the first predefined value while the rotating member 51 takes the second angular position, when a period in which the rotating member 51 takes the first angular position during the defrosting operation is not present, the angular position determining section 71 determines the angular position of the rotating member 51 to the first angular position. When a period in which the rotating member 51 takes the first angular position during the defrosting operation is present, the angular position determining section 71 determines the angular position of the rotating member 51 to the third angular position.

When the flow passages 11a to 15a are arrayed in the up-and-down direction as in Embodiment 1 as described above, it is preferred that the high-temperature gas refrigerant discharged from the compressor 1 be caused to flow sequentially in the order from the flow passage arranged on the upper side. When the high-temperature gas refrigerant is caused to flow through the flow passage on the upper side to perform the defrosting, water melted from the frost flows downward. At this time, vicinities of the flow passages arranged on the lower side can be defrosted through use of heat of water that flows downward, and thereby a defrosting time period of the outdoor heat exchanger 10 can be shortened.

(Cooling Operation)

During the heating operation, the flow passage determining section 72 determines the flow passage of the flow switching device 2 to the flow passage connecting the discharge side of the compressor 1 and the outdoor heat exchanger 10 to each other. Further, the angular position determining section 71 determines the angular position of the rotating member 51 of the switching valve 40 to the angular position that allows all of the outlets 41 to 45 to communicate with the first inlet 46. The control section 73 switches the flow switching device 2 and the switching valve 40 corresponding to determination results of the flow passage determining section 72 and the angular position determining section 71, and activates the compressor 1.

At the time of activation of the compressor 1, the refrigerant is sucked through the suction port of the compressor 1. Then, the refrigerant turns into high-temperature and high-pressure gas refrigerant, and is discharged through a discharge port of the compressor 1. The high-temperature and high-pressure gas refrigerant discharged from the compressor 1 flows into passages 11a to 15a of the outdoor heat exchanger 10 through the flow switching device 2 and the header 30. Then, the high-temperature and high-pressure gas refrigerant flowing into the flow passages 11a to 15a is cooled by the outside air, and flows out from the flow passages 11a to 15a as refrigerant in a liquid state. The refrigerant flowing out from the flow passages 11a to 15a flows into the switching valve 40 from outlets 41 to 45.

The high-pressure liquid refrigerant flowing into the switching valve 40 flows out from the switching valve 40 through the first inlet 46 and flows into the expansion valve 4. The liquid-state refrigerant flowing into the expansion valve 4 is decompressed in the expansion valve 4, is brought into a low-temperature two-phase gas-liquid state, and flows out from the expansion valve 4. The low-temperature two-phase gas-liquid refrigerant flowing out from the expansion valve 4 flows into the indoor heat exchanger 3. The refrigerant flowing into the indoor heat exchanger 3 cools the indoor air to be evaporated. Then, the refrigerant passes through the flow switching device 2 and the accumulator 5 and is sucked into the compressor 1 again.

As described above, in the air-conditioning apparatus 100 constructed in a manner as in Embodiment 1, in the switching valve 40, an outlet with which the second inlet 47 communicates is sequentially switched. In this manner, the defrosting of the outdoor heat exchanger 10 can be performed while the heating operation is performed. At this time, in the air-conditioning apparatus 100 according to Embodiment 1, when the high-temperature gas refrigerant discharged from the compressor 1 is supplied to a part of the flow passages of the outdoor heat exchanger 10 to perform the defrosting, mixing of the low-temperature refrigerant flowing out from the expansion valve 4 to the flow passage can be prevented. Consequently, the air-conditioning apparatus 100 according to Embodiment 1 can prevent such a situation that the defrosting time period is prolonged due to lowering of the temperature of the refrigerant supplied to the part of the passages of the outdoor heat exchanger 10 to perform the defrosting. Further, the air-conditioning apparatus 100 according to Embodiment 1 can switch a connection destination of each of the flow passages 11a to 15a of the outdoor heat exchanger 10 to one of the discharge side of the compressor 1 and the expansion valve 4 side with use of the one switching valve 40. Consequently, in the air-conditioning apparatus 100 according to Embodiment 1, increase in size of the outdoor unit 101 can be prevented, and increase in installation space for the outdoor unit 101 can also be prevented, accordingly.

Figure 8:
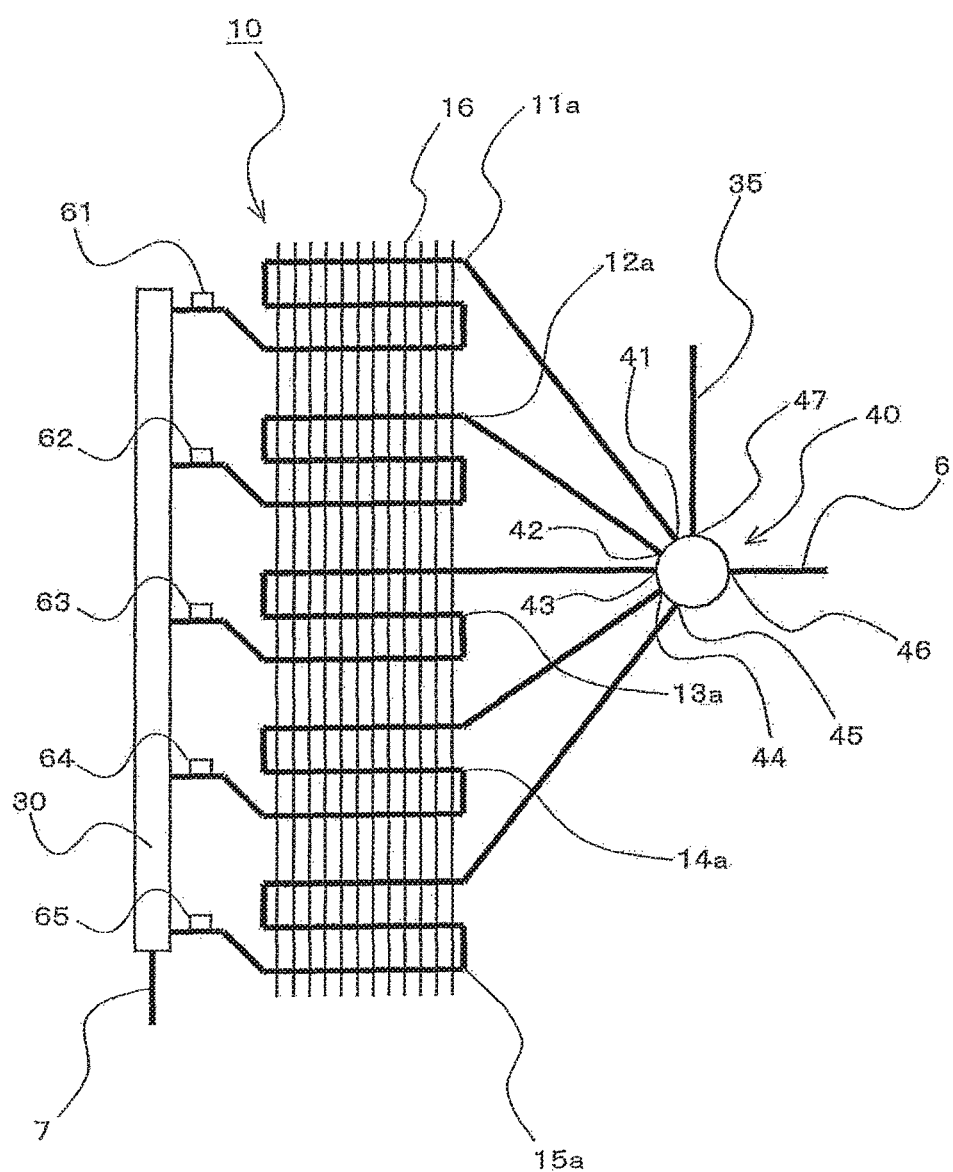
FIG. 8 is a refrigerant circuit diagram for illustrating another example of the outdoor heat exchanger of the air-conditioning apparatus according to Embodiment 1 of the present invention.

In Embodiment 1, the outdoor heat exchanger 10 is constructed by the plurality of heat exchangers 11 to 15. However, the present invention is not limited to this configuration, and the outdoor heat exchanger 10 may be constructed by one heat exchanger as illustrated in, for example, FIG. 8 as long as the outdoor heat exchanger 10 includes a plurality of flow passages that are connected in parallel. That is, a plurality of fins 16 may be arrayed at predefined pitch intervals, and the flow passages 11a to 15a may be provided to pass through these fins 16. Even when the outdoor heat exchanger 10 is constructed in this manner, effects similar to those described above can be obtained.

Figure 9:
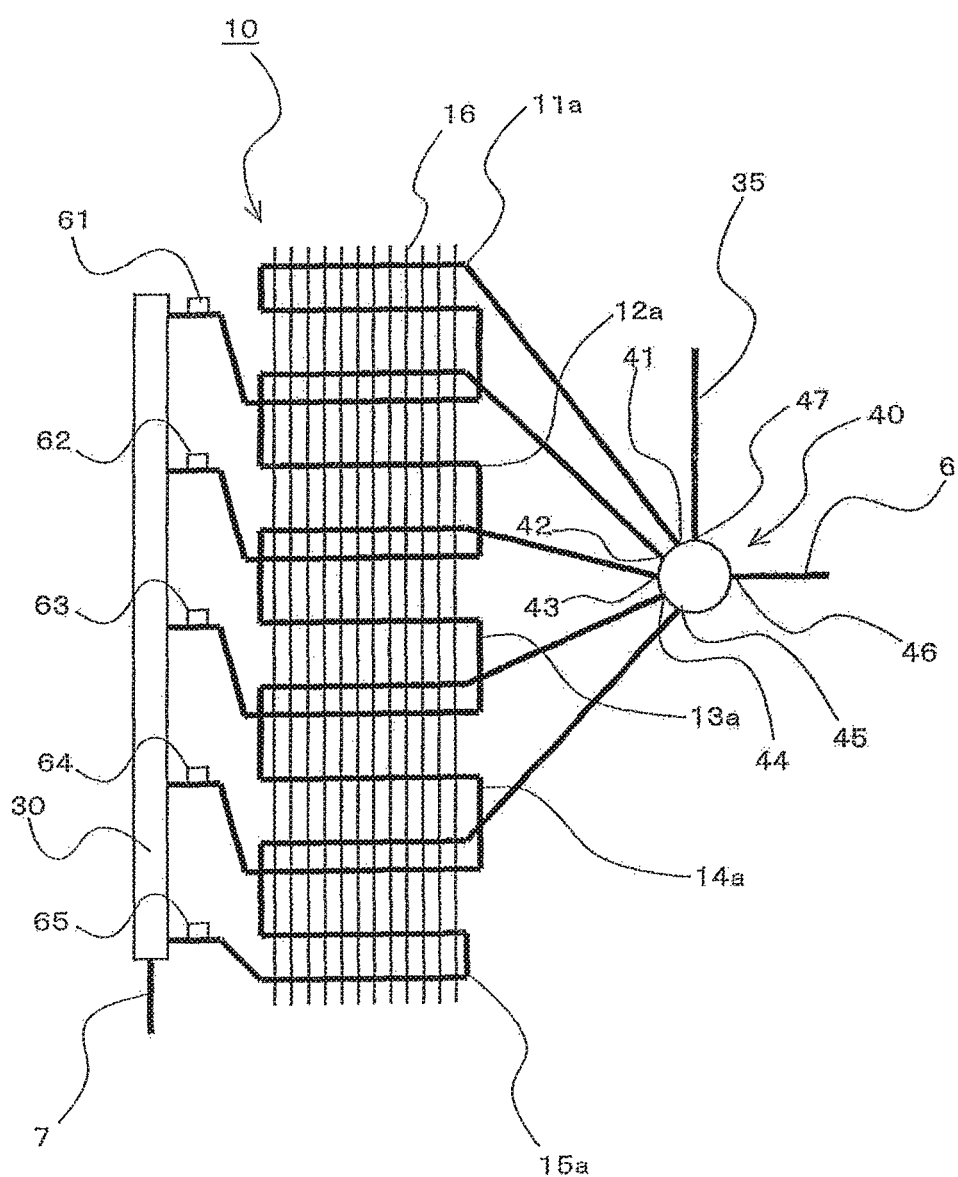
FIG. 9 is a refrigerant circuit diagram for illustrating another example of the outdoor heat exchanger of the air-conditioning apparatus according to Embodiment 1 of the present invention.

Further, when the flow passages 11a to 15a of the outdoor heat exchanger 10 are arrayed in the up-and-down direction, the flow passages 11a to 15a may be constructed as illustrated in FIG. 9. That is, under a state in which the outdoor heat exchanger 10 is observed from a horizontal direction, in other words, a state in which the outdoor heat exchanger 10 is viewed from a front side, a part of the flow passage arranged on the upper side may overlap with the flow passage arranged on the lower side. A part of the flow passage arranged on the upper side is arranged in a position lower than the flow passage arranged on the lower side. Consequently, when the high-temperature gas refrigerant discharged from the compressor 1 is supplied to the flow passage arranged on the upper side to perform the defrosting, a vicinity of the flow passage arranged on the lower side can also be defrosted, and thereby the defrosting time period of the outdoor heat exchanger 10 can be shortened.

Figure 10:
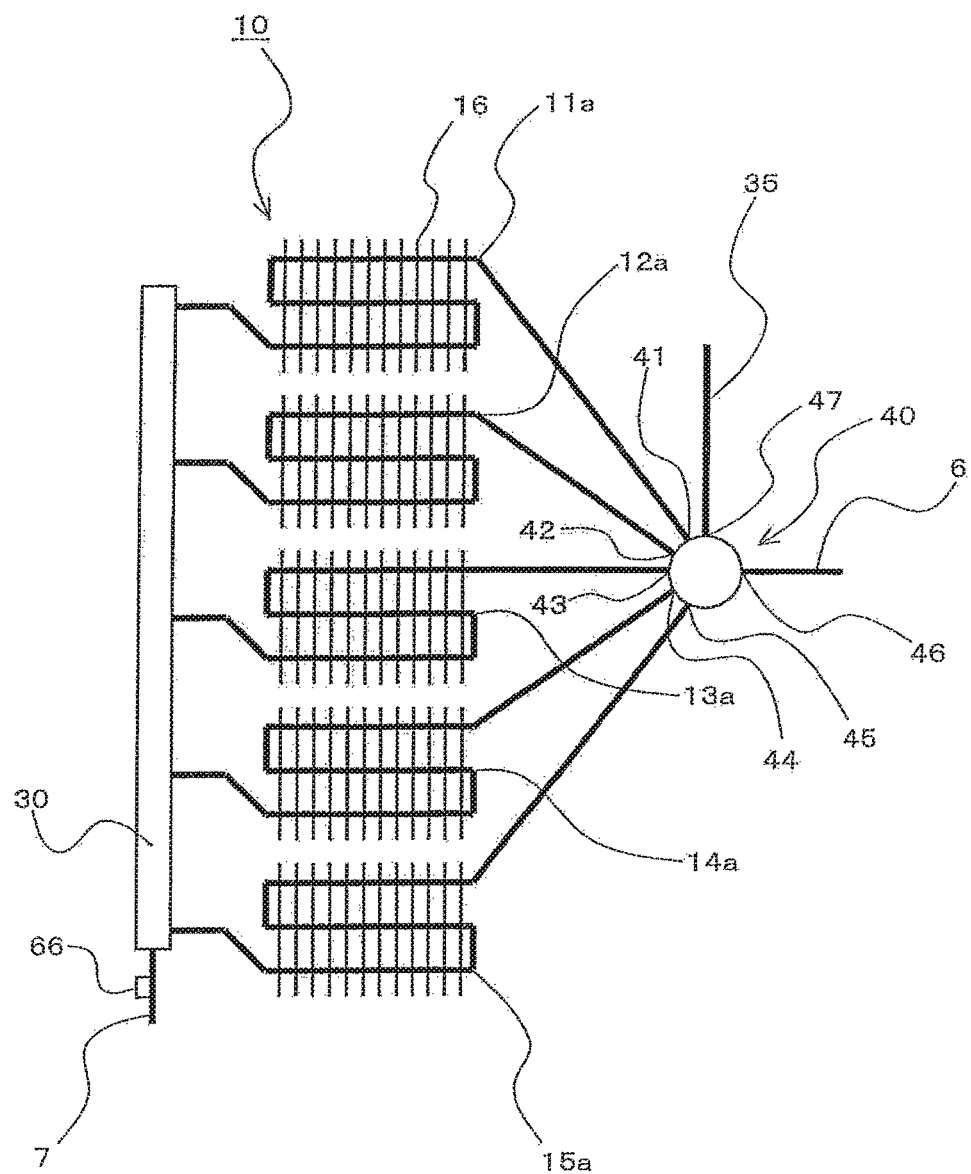
FIG. 10 is a refrigerant circuit diagram for illustrating the vicinity of another example of the outdoor heat exchanger of the air-conditioning apparatus according to Embodiment 1 of the present invention.

Further, in Embodiment 1, the temperature sensors 61 to 65 are each provided to a corresponding one of the flow passages 11a to 15a of the outdoor heat exchanger 10, and the measurement values of these temperature sensors 61 to 65 are used to determine completion of the defrosting of each of the flow passages 11a to 15a. However, the present invention is not limited to this configuration. The one temperature sensor 66 may be arranged as illustrated in FIG. 10, and the measurement value of the temperature sensor 66 may be used to determine completion of the defrosting of each of the flow passages 11a to 15a. Specifically, the air-conditioning apparatus 100 according to Embodiment 1 includes, at a position located between the outdoor heat exchanger 10 and the suction side of the compressor 1 during the heating operation, the pipe 7 that is a merging portion configured to allow the flow passages 11a to 15a to merge with each other. The temperature sensor 66 may be provided to the pipe 7. The temperature sensor 66 measures a temperature of the refrigerant flowing out from the flow passages 11a to 15a to merge during the heating operation. As described above, when the high-temperature gas refrigerant discharged from the compressor 1 is supplied to a part of the passages of the outdoor heat exchanger 10 during the heating operation to perform the defrosting, the temperature of the refrigerant flowing through the flow passage is 0 degrees Celsius until the melting of the frost in the vicinity of the flow passage is completed. Then, after the melting of the frost in the vicinity of the flow passage is completed, the temperature of the refrigerant flowing through the flow passage rises. That is, when the high-temperature gas refrigerant discharged from the compressor 1 is supplied to a part of the passages of the outdoor heat exchanger 10 during the heating operation to perform the defrosting, after the melting of the frost in the vicinity of the flow passage has been completed, the temperature of the refrigerant flowing out from the flow passages 11a to 15a to merge also rises. Consequently, when the measurement value of the temperature sensor 66 is equal to or larger than a predefined value, it can be determined that the defrosting of the flow passage being defrosted has been completed. The air-conditioning apparatus 100 is constructed as described above, and thus the number of the temperature sensors can be reduced, and thereby cost of the air-conditioning apparatus 100 can be reduced.

In this case, the predefined value corresponds to the first predefined value of the present invention.

Further, determination of whether or not the defrosting of each of the flow passages 11a to 15a of the outdoor heat exchanger 10 has been completed may be performed on the basis of a time period. That is, in a case in which the high-temperature gas refrigerant discharged from the compressor 1 is supplied to a part of the passages of the outdoor heat exchanger 10 during the heating operation to perform the defrosting, it may be determined that the defrosting of the flow passage has been completed when a time period for which the high-temperature gas refrigerant is supplied is equal to or larger than a predefined time period. The determination is performed by, for example, the angular position determining section 71. Measurement of the time period for which the high-temperature gas refrigerant is supplied is performed by the clocking section 74. Further, when such defrosting is performed in the outdoor heat exchanger 10 including the flow passages 11a to 15a arrayed in the up-and-down direction, it is preferred that a time period for which the high-temperature gas refrigerant is caused to flow through the flow passage arranged on the lower side be set longer than a time period for which the high-temperature gas refrigerant is caused to flow through the flow passage arranged on the upper side. When the flow passage arranged on the upper side is defrosted, water melted from the frost may flow down into the vicinity of the flow passage arranged on the lower side, and the water may be frozen to turn into frost again. Even in such a case, the frost in the vicinity of the flow passage arranged on the lower side can reliably be removed. The air-conditioning apparatus 100 is constructed as described above, and thus the temperature sensors configured to measure the temperatures of the refrigerant flowing out from the flow passages 11a to 15a are unnecessary, and thereby cost of the air-conditioning apparatus 100 can be further reduced. Even in a case of determining completion of defrosting of each of the flow passages with use of the temperature sensors 61 to 66, the time period for which the high-temperature gas refrigerant is caused to flow through the flow passage arranged on the lower side may be set longer than the time period for which the high-temperature gas refrigerant is caused to flow through the flow passage arranged on the upper side. The above-mentioned configuration can be achieved, for example, by setting a minimum time period for supplying the high-temperature gas refrigerant for each of the flow passages.

Further, when the defrosting of the outdoor heat exchanger 10 is not completed even after the elapse of the predefined time period, the flow passage of the flow switching device 2 may be switched to the flow passage connecting the discharge side of the compressor 1 and the outdoor heat exchanger 10 to each other. With this operation, the heating operation is temporarily stopped, but the high-temperature refrigerant discharged from the compressor 1 can be supplied to all of the flow passages 11a to 15a of the outdoor heat exchanger 10. Consequently, even when an amount of frost formation in the outdoor heat exchanger 10 is so large that the defrosting is not completed even after the elapse of the predefined time period, the frost adhering to the outdoor heat exchanger 10 can be removed. Whether or not the defrosting of the outdoor heat exchanger 10 is not completed even after the elapse of the predefined time period can be determined on the basis of whether or not the measurement values of the temperature sensors 61 to 66 are smaller than the predefined values even after the elapse of the predefined time period. The determination is performed by the flow passage determining section 72.

Further, in Embodiment 1, each of the flow passages 11a to 15a of the outdoor heat exchanger 10 is constructed by one flow passage. However, the present invention is not limited to this configuration, and each of the flow passages 11a to 15a may be constructed by a plurality of flow passages.

Embodiment 2

The configuration of the switching valve 40 used in the present invention is not limited to the configuration illustrated in Embodiment 1. In Embodiment 2, some other examples of the switching valve 40 are described. In the following, a case in which the outdoor heat exchanger 10 includes three flow passages 11a to 13a connected in parallel, that is, a case in which the switching valve includes three outlets 41 to 43 is described. Further, in Embodiment 2, matters that are not particularly described are similar to those of Embodiment 1, and the same functions and same configurations are denoted by the same reference symbols for description.

Figure 11:
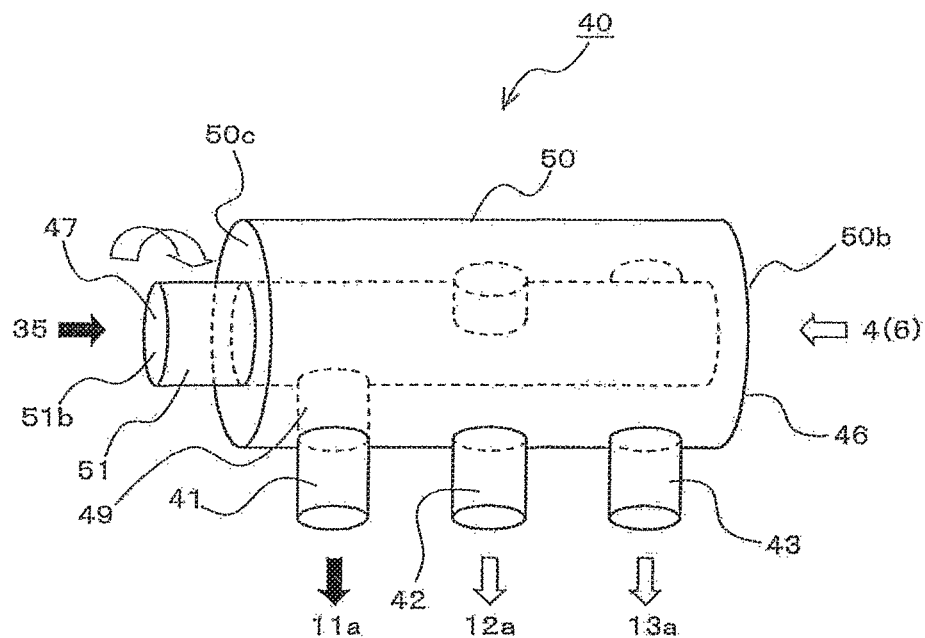
FIG. 11 is a view for illustrating an example of the switching valve of Embodiment 2 of the present invention.

FIG. 11 is a view for illustrating an example of the switching valve of Embodiment 2 of the present invention. The outlined arrows illustrated in FIG. 11 each denote a flow of the low-temperature refrigerant flowing out from the expansion valve 4 during the heating operation. Further, the solid arrows illustrated in FIG. 11 each denote a flow of the high-temperature refrigerant flowing from the discharge side of the compressor 1 through the bypass circuit 35.

The switching valve 40 illustrated in FIG. 11 includes the body 50, and the rotating member 51 that is provided to be rotatable against the body 50. The body 50 has a cylindrical shape in which both of ends 50b and 50c are closed. The first inlet 46 is provided to the end 50b of the body 50. As described in Embodiment 1, the first inlet 46 communicates with the expansion valve 4 through the pipe 6. Further, the outlets 41 to 43 are provided to an outer peripheral portion of the body 50. As described in Embodiment 1, the outlet 41 communicates with the flow passage 11a of the outdoor heat exchanger 10, the outlet 42 communicates with the flow passage 12a of the outdoor heat exchanger 10, and the outlet 43 communicates with the flow passage 13a of the outdoor heat exchanger 10.

The rotating member 51 has a cylindrical shape in which both of the ends are closed. A part of the rotating member 51 is arranged inside the body 50. Further, one end 51b of the rotating member 51 protrudes from the end 50c of the body 50. Similarly to Embodiment 1, the rotating member 51 is connected to the motor configured to rotate the rotating member 51 through intermediation of the gear or other members. The second inlet 47 is provided to the end 51b of the rotating member 51. As described in Embodiment 1, the second inlet 47 communicates with the bypass circuit 35.

Further, a plurality of communication pipes 49 are provided to an outer peripheral portion of the rotating member 51 in a protruding manner so that the second inlet 47 and the outlets 41 to 43 communicate with each other. Specifically, one communication pipe 49 for allowing the second inlet 47 and the outlet 41 to communicate with each other is provided. One communication pipe 49 for allowing the second inlet 47 and the outlet 42 to communicate with each other is provided. One communication pipe 49 for allowing the second inlet 47 and the outlet 43 to communicate with each other is provided. That is, a total of three connection pipes are provided to the outer peripheral portion of the rotating member 51.

That is, the rotating member 51 is rotated up to a position at which the outlet 41 and the communication pipe 49 are opposed to each other, and thus, the angular position of the rotating member 51 can be set to an angular position that allows the second inlet 47 and the outlet 41 to communicate with each other and that allows the first inlet 46 and the outlets 42 and 43 to communicate with each other. The rotating member 51 is rotated up to a position at which the outlet 42 and the communication pipe 49 are opposed to each other, and thus, the angular position of the rotating member 51 can be set to an angular position that allows the second inlet 47 and the outlet 42 to communicate with each other and that allows the first inlet 46 and the outlets 41 and 43 communicate with each other. The rotating member 51 is rotated up to a position at which the outlet 43 and the communication pipe 49 are opposed to each other, and thus, the angular position of the rotating member 51 can be set to an angular position that allows the second inlet 47 and the outlet 43 to communicate with each other and that allows the first inlet 46 and the outlets 41 and 42 to communicate with each other. The rotating member 51 is rotated up to an angular position at which the communication pipes 49 are not opposed to any of the outlets 41 to 43, with the result that all of the outlets 41 to 43 communicate with the first inlet.

Figure 12:
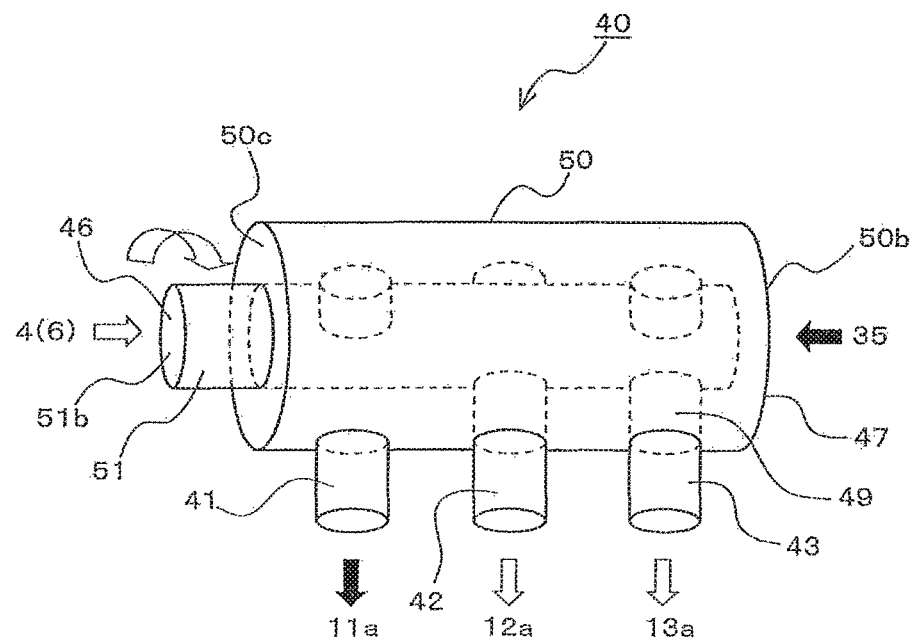
FIG. 12 is a view for illustrating another example of the switching valve of Embodiment 2 of the present invention.

FIG. 12 is a view for illustrating another example of the switching valve of Embodiment 2 of the present invention. The outlined arrows illustrated in FIG. 12 each denote a flow of the low-temperature refrigerant flowing out from the expansion valve 4 during the heating operation. Further, the solid arrows illustrated in FIG. 12 each denote a flow of the high-temperature refrigerant flowing from the discharge side of the compressor 1 through the bypass circuit 35.

The switching valve 40 illustrated in FIG. 12 includes the body 50, and the rotating member 51 that is provided to be rotatable against the body 50. The body 50 has a cylindrical shape in which both of the ends 50*b* and 50*c* are closed. The second inlet 47 is provided to the end 50*b* of the body 50. As described in Embodiment 1, the second inlet 47 communicates with the bypass circuit 35. Further, the outlets 41 to 43 are provided to the outer peripheral portion of the body 50. As described in Embodiment 1, the outlet 41 communicates with the flow passage 11*a* of the outdoor heat exchanger 10, the outlet 42 communicates with the flow passage 12*a* of the outdoor heat exchanger 10, and the outlet 43 communicates with the flow passage 13*a* of the outdoor heat exchanger 10.

The rotating member 51 has a cylindrical shape in which both of the ends are closed. A part of the rotating member 51 is arranged inside the body 50. Further, the one end 51*b* of the rotating member 51 protrudes from the end 50*c* of the body 50. Similarly to Embodiment 1, the rotating member 51 is connected to the motor configured to rotate the rotating member 51 through intermediation of the gear or other members. The first inlet 46 is provided to the end 51*b* of the rotating member 51. As described in Embodiment 1, the first inlet 46 is connected to the expansion valve 4 through the pipe 6.

Further, the plurality of communication pipes 49 are provided to the outer peripheral portion of the rotating member 51 in a protruding manner so that the first inlet 46 and the outlets 41 to 43 are communicated with each other. Specifically, under a state in which the second inlet 47 and the outlet 41 are communicated with each other, two communication pipes 49 for allowing the first inlet 46 and the outlets 42 and 43 to communicate with each other are provided. Under a state in which the second inlet 47 and the outlet 42 are communicated with each other, two communication pipes 49 for allowing the first inlet 46 and the outlets 41 and 43 to communicate with each other are provided. Under a state in which the second inlet 47 and the outlet 43 are communicated with each other, two communication pipes 49 for allowing the first inlet 46 and the outlets 41 and 42 to communicate with each other are provided. Further, under a state in which the second inlet 47 is not communicated with any of the outlets 41 to 43, three communication pipes 49 for allowing the first inlet 46 and the outlets 41 to 43 to communicate with each other are provided. That is, a total of nine connection pipes are provided to the outer peripheral portion of the rotating member 51.

That is, the rotating member 51 is rotated up to a position at which the outlets 42 and 43 and the communication pipes 49 are opposed to each other, and thus, the angular position of the rotating member 51 can be set to an angular position that allows the second inlet 47 and the outlet 41 to communicate with each other and that allows the first inlet 46 and the outlets 42 and 43 to communicate with each other. The rotating member 51 is rotated up to a position at which the outlets 41 and 43 and the communication pipes 49 are opposed to each other, and thus, the angular position of the rotating member 51 can be set to an angular position that allows the second inlet 47 and the outlet 42 to communicate with each other and that allows the first inlet 46 and the outlets 41 and 43 to communicate with each other. The rotating member 51 is rotated up to a position at which the outlets 41 and 42 and the communication pipes 49 are opposed to each other, and thus, the angular position of the rotating member 51 can be set to an angular position that allows the second inlet 47 and the outlet 43 to communicate with each other and that allows the first inlet 46 and the outlets 41 and 42 to communicate with each other. Further, the rotating member 51 is rotated up to a rotational position at which the outlets 41 to 43 and the communication pipes 49 are opposed to each other, and thus, all of the outlets 41 to 43 are communicated with the first inlet.

As described above, even when the switching valve 40 is constructed as in Embodiment 2, the effects described in Embodiment 1 can also be obtained, except for the effect of allowing the switching valve to serve as the distributor.

In a case in which the switching valve 40 illustrated in Embodiment 2 is used in the present invention, it is preferred that the switching valve 40 illustrated in FIG. 11 be used. This is because manufacturing cost of the switching valve 40 can be reduced accordingly, as the number of the communication pipes 49 is smaller. Further, in a case of the switching valve 40 illustrated in FIG. 11, the high-temperature refrigerant discharged from the compressor 1 flows through the rotating member 51, and thus the high-temperature refrigerant is cooled only by the refrigerant flowing through the body 50. On the other hand, in a case of the switching valve 40 illustrated in FIG. 12, the high-temperature refrigerant discharged from the compressor 1 flows through the body 50, and thus the high-temperature refrigerant is cooled by the refrigerant flowing through the rotating member 51 and air around the body 50. Consequently, in the switching valve 40 illustrated in FIG. 12, the temperature of the refrigerant supplied to the outdoor heat exchanger 10 during the defrosting operation is lowered as compared to the case of the switching valve 40 illustrated in Embodiment 11. Also for this reason, in the case in which the switching valve 40 illustrated in Embodiment 2 is used in the present invention, it is preferred that the switching valve 40 illustrated in FIG. 11 be used.

Embodiment 3

An on-off valve 36 as described below may be provided in the bypass circuit 35 of the air-conditioning apparatus 100 illustrated in Embodiment 1 or Embodiment 2. Further, in Embodiment 3, matters that are not particularly described are similar to those of Embodiment 1 or Embodiment 2, and the same functions and same configurations are denoted by the same reference symbols for description.

Figure 13:
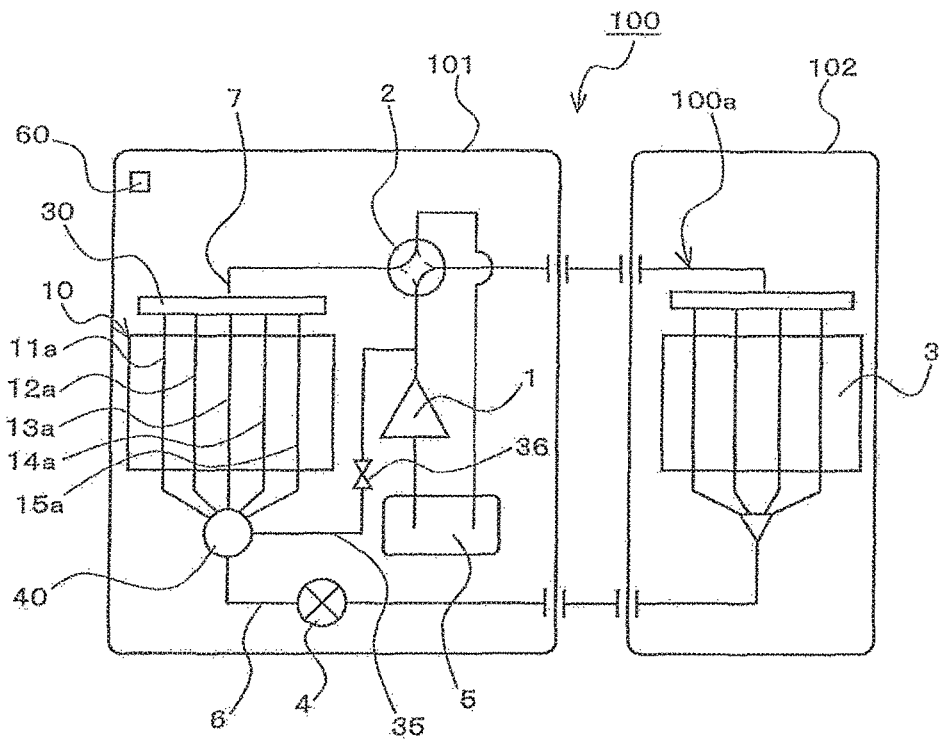
FIG. 13 is a refrigerant circuit diagram for illustrating the air-conditioning apparatus according to Embodiment 3 of the present invention.
Figure 14:
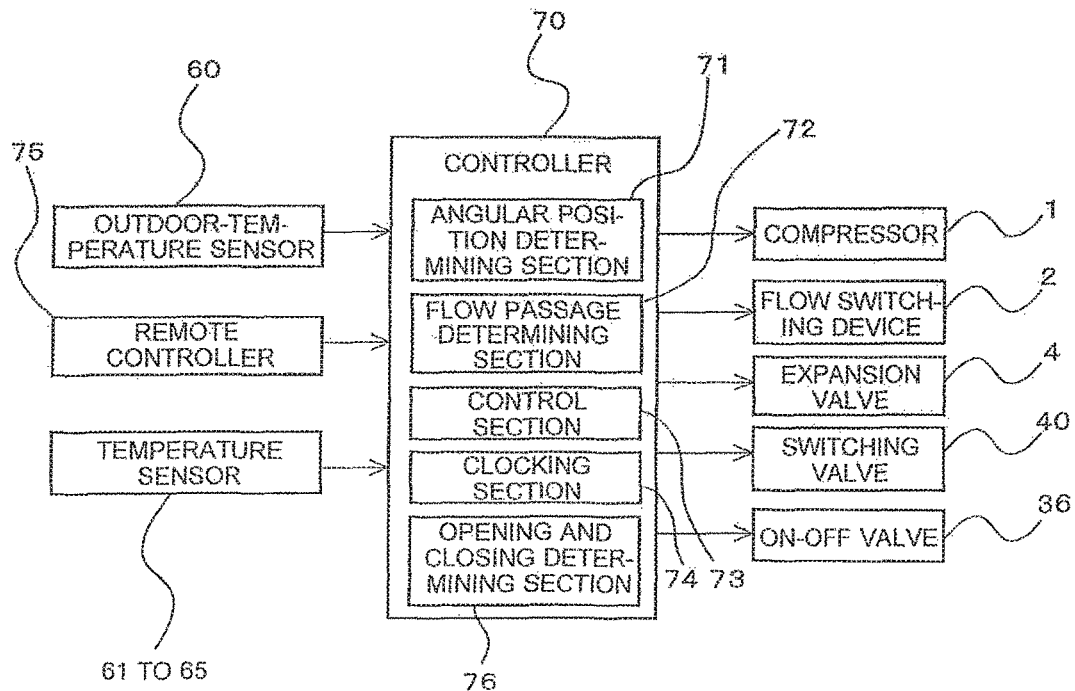
FIG. 14 is a hardware configuration diagram and a functional block diagram of the air-conditioning apparatus according to Embodiment 3 of the present invention.

FIG. 13 is a refrigerant circuit diagram for illustrating the air-conditioning apparatus according to Embodiment 3 of the present invention. Further, FIG. 14 is a hardware configuration diagram and a functional block diagram of the air-conditioning apparatus.

The air-conditioning apparatus 100 according to Embodiment 3 includes, in the bypass circuit 35, the on-off valve 36 configured to open and close a flow passage of the bypass circuit 35. Further, the controller 70 includes an opening and closing determining section 76 configured to determine opening and closing of the on-off valve 36 as a function section. When the defrosting operation of the outdoor heat exchanger 10 is started, in a case in which a measurement value of the outdoor-temperature sensor 60 is larger than a predefined value, the opening and closing determining section 76 determines the on-off valve 36 to a closed state. In a case in which the measurement value of the outdoor-temperature sensor 60 is equal to or smaller than the predefined value, the opening and closing determining section 76 determines the on-off valve 36 to an open state.

Here, the predefined value corresponds to the second predefined value of the present invention. The predefined value only needs to be a value larger than 0 degrees Celsius, for example, 2 degrees Celsius. Further, the outdoor-temperature sensor 60 corresponds to a second temperature sensor of the present invention.

In the air-conditioning apparatus 100 constructed as described above, during a heating operation in which the defrosting of the outdoor heat exchanger 10 is not performed, the opening and closing determining section 76 determines the on-off valve 36 to the closed state. Then, the control section 73 controls the on-off valve 36 to be brought into the state determined by the opening and closing determining section 76. Further, when the defrosting of the outdoor heat exchanger 10 is performed during the heating operation, in a case in which the measurement value of the outdoor-temperature sensor 60 is equal to smaller than the predefined value, the opening and closing determining section 76 determines the on-off valve 36 to the open state. Then, the control section 73 controls the on-off valve 36 to be brought into the state determined by the opening and closing determining section 76. With this operation, the defrosting operation of the outdoor heat exchanger 10 described in Embodiment 1 is attained. That is, the high-temperature refrigerant discharged from the compressor 1 is sequentially supplied to each of the flow passages of the outdoor heat exchanger 10, and thereby the defrosting of the outdoor heat exchanger 10 can be performed.

Meanwhile, when the defrosting of the outdoor heat exchanger 10 is performed during the heating operation, and in a case in which the measurement value of the outdoor-temperature sensor 60 is larger than the predefined value, the opening and closing determining section 76 determines the on-off valve 36 to the closed state. Then, the control section 73 controls the on-off valve 36 to be brought into the state determined by the opening and closing determining section 76. With this operation, the high-temperature refrigerant discharged from the compressor 1 does not flow through each of the flow passages of the outdoor heat exchanger 10 during the defrosting operation of the outdoor heat exchanger 10.

The state in which the measurement value of the outdoor-temperature sensor 60 is larger than the predefined value is a state in which a temperature of the outside air is relatively high. In this state, with heat of the outside air, the frost adhering to the outdoor heat exchanger 10 can be removed without supplying the high-temperature refrigerant to each of the flow passages of the outdoor heat exchanger 10. Consequently, the on-off valve 36 is set to the closed state during the defrosting operation, and thus the flow rate of the high-temperature refrigerant that can be supplied to the indoor heat exchanger 3 can be increased, and thereby a heating capacity of the air-conditioning apparatus 100 can be enhanced.

In this case, the switching valve 40 may be switched or may not be switched. When the switching valve 40 is not switched, the refrigerant flowing out from the expansion valve 4 flows into all of the flow passages of the outdoor heat exchanger 10. Consequently, the whole of the outdoor heat exchanger 10 can serve as an evaporator, and thereby the heating capacity of the air-conditioning apparatus 100 can be further enhanced. Further, switching valve 40 is switched, and thus the low-temperature refrigerant flowing out from the expansion valve 4 does not flow through a part of the flow passages of the outdoor heat exchanger 10. Then, the flow passage through which the low-temperature refrigerant does not flow is switched. The flow passage through which the low-temperature refrigerant does not flow is not cooled by the low-temperature refrigerant, and hence is liable to be defrosted by the temperature of the outside air. Consequently, the defrosting time period of the outdoor heat exchanger 10 can be shortened.

Embodiment 4

In the air-conditioning apparatus 100 illustrated in Embodiment 1 to Embodiment 3, at the time of start-up of the heating operation, that is, at the time of activation of the compressor 1, the switching valve 40 may be switched, and, for example, the high-temperature refrigerant discharged from the compressor 1 may be supplied to a part of the passages of the outdoor heat exchanger 10 for a predefined time period. The refrigerant remaining in the outdoor heat exchanger 10 can be evaporated by the high-temperature refrigerant, that is, the flow rate of the refrigerant circulating the refrigeration cycle circuit 100a can be increased, and thereby a start-up time period of the heating operation can be shortened.

When the flow passages of the outdoor heat exchanger 10 are arrayed in the up-and-down direction, it is preferred that the high-temperature refrigerant discharged from the compressor 1 be supplied to the flow passage arranged on the lowermost side. This is because refrigerant of the largest amount remains in the flow passage arranged on the lowermost side.

Figure 15:
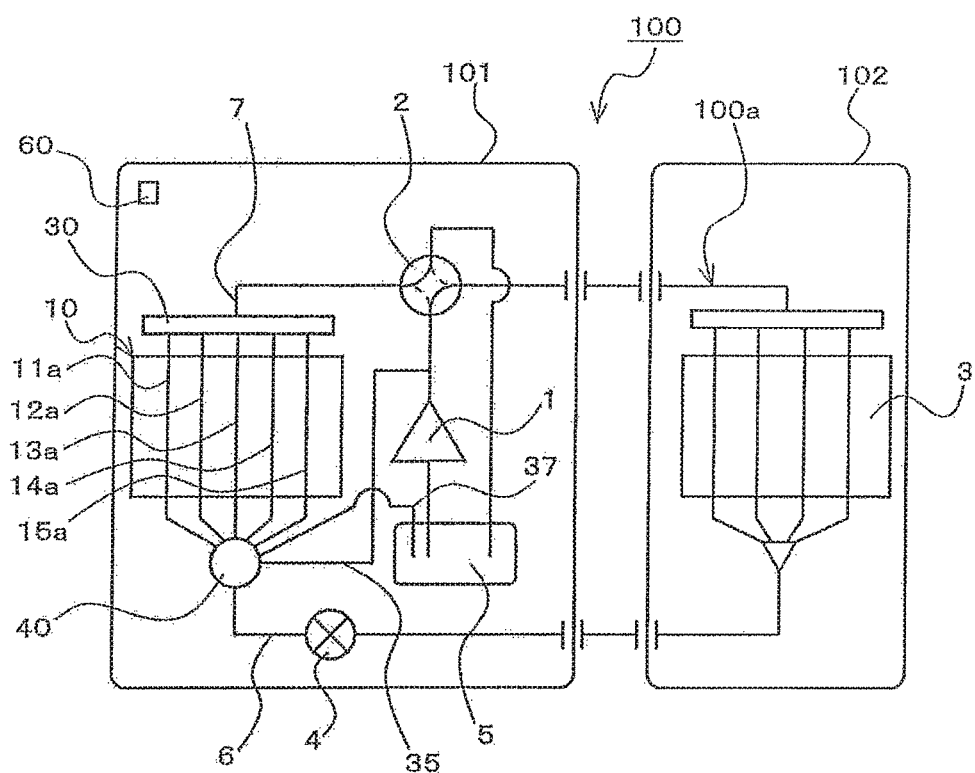
FIG. 15 is a refrigerant circuit diagram for illustrating the air-conditioning apparatus according to Embodiment 4 of the present invention.

Further, when the accumulator 5 is provided in the air-conditioning apparatus 100, as illustrated in FIG. 15, a second bypass circuit 37 may be provided to supply the high-temperature refrigerant discharged from the compressor 1 to the accumulator 5.

FIG. 15 is a refrigerant circuit diagram for illustrating an air-conditioning apparatus according to Embodiment 4 of the present invention.

The second bypass circuit 37 has a first end connected to the switching valve 40, and a second end connected to the accumulator 5. Consequently, when the switching valve 40 is switched at the time of start-up of the heating operation, that is, at the time of activation of the compressor 1, the high-temperature refrigerant discharged from the compressor 1 passes through the bypass circuit 35, the switching valve 40, and the second bypass circuit 37 and flows into the accumulator 5. With this operation, the refrigerant remaining in the accumulator 5 can be evaporated, that is, the flow rate of the refrigerant circulating through the refrigeration cycle circuit 100a can be increased, and thereby the start-up time period of the heating operation can be shortened.

As a connection configuration between the second bypass circuit 37 and the switching valve 40, for example, a configuration in which an outlet to be connected to the second bypass circuit 37 is provided to the switching valve 40 is conceivable. Further, for example, the second bypass circuit 37 may be connected in parallel to the flow passages of the outdoor heat exchanger 10 to which the high-temperature refrigerant discharged from the compressor 1 is supplied at the time of activation of the compressor 1. That is, the second bypass circuit 37 may be connected to the outlets of the switching valve 40 to which the flow passages are connected.

REFERENCE SIGNS LIST 1 compressor 2 flow switching device 3 indoor heat exchanger 4 expansion valve 5 accumulator 6 pipe 7 pipe (merging portion) 10 outdoor heat exchanger 11 heat exchanger 11a flow passage 11b fin 12 heat exchanger 12a flow passage 12b fin 13 heat exchanger 13a flow passage 13b fin 14 heat exchanger 14a flow passage 14b fin 15 heat exchanger 15a flow passage 15b fin 16 fin 30 header 35 bypass circuit 36 on-off valve 37 second bypass circuit 40 switching valve 41 to 45 outlet 46 first inlet 47 second inlet 48 connection pipe 48a end 49 communication pipe 50 body 50a lower portion 50b end 50c end 51 rotating member 51a upper portion 51b end 52 gear 55 motor 55a rotation shaft 56 gear 60 outdoor-temperature sensor 61 to 66 temperature sensor 70 controller 71 angular position determining section 72 flow passage determining section 73 control section 74 clocking section 75 remote controller 76 closing determining section 100 air-conditioning apparatus 100a refrigeration cycle circuit 101 outdoor unit 102 indoor unit

The invention claimed is:

1. An air-conditioning apparatus comprising:
a refrigeration cycle circuit including a compressor, an indoor heat exchanger configured to serve as a condenser, an expansion valve, and an outdoor heat exchanger configured to serve as an evaporator;
a switching valve provided between the expansion valve and the outdoor heat exchanger; and
a bypass circuit having a first end and a second end, the first end being connected between the compressor and the indoor heat exchanger,
the second end being connected to the switching valve,
the outdoor heat exchanger including a first flow passage and a second flow passage connected in parallel between the expansion valve and a suction side of the compressor,
the switching valve including
a body,
a rotating member,
a first inlet provided to the body, and communicating with the expansion valve,
a second inlet provided to the rotating member, and communicating with the second end of the bypass circuit,
a first outlet provided to the body, and communicating with the first flow passage, and
a second outlet provided to the body, and communicating with the second flow passage,
the rotating member being rotatable between a plurality of angular positions, the plurality of angular positions including
a first angular position allowing the first inlet to communicate with the second outlet, and allowing the second inlet to communicate with the first outlet,
a second angular position allowing the first inlet to communicate with the first outlet, and allowing the second inlet to communicate with the second outlet, and
a third angular position allowing the first inlet to communicate with both of the first outlet and the second outlet.

2. The air-conditioning apparatus of claim 1, wherein the first inlet, the first outlet, and the second outlet are provided to a lower portion of the body.

3. The air-conditioning apparatus of claim 1,
wherein the first flow passage is positioned upper than the second flow passage, and
wherein, during a defrosting operation of the outdoor heat exchanger, the switching valve causes the rotating member to take the first angular position and then take the second angular position.

4. The air-conditioning apparatus of claim 3, wherein a time period in which the rotating member takes the second angular position is longer than a time period in which the rotating member takes the first angular position.

5. The air-conditioning apparatus of claim 3, wherein, under a state in which the outdoor heat exchanger is observed from a horizontal direction, a part of the first flow passage overlaps with the second flow passage.

6. The air-conditioning apparatus of claim 3, wherein, when the compressor is activated, refrigerant passing through the bypass circuit and flowing into the switching valve flows into the second flow passage of the outdoor heat exchanger.

7. The air-conditioning apparatus of claim 1, further comprising
a controller configured to determine the angular position of the rotating member of the switching valve, and to switch the angular position of the rotating member to the angular position determined by the controller.

8. The air-conditioning apparatus of claim 7, further comprising:
a temperature sensor provided to the first flow passage; and
a temperature sensor provided to the second flow passage,
wherein, during a defrosting operation of the outdoor heat exchanger, in a case in which a measurement value of the temperature sensor provided to the first flow passage is equal to or larger than a first predefined value while the rotating member takes the first angular position,
when a period in which the rotating member takes the second angular position during the defrosting operation is not present, the controller is configured to determine the angular position of the rotating member to the second angular position, and when a period in which the rotating member takes the second angular position during the defrosting operation is present, the controller is configured to determine the angular position of the rotating member to the third angular position, and wherein, during the defrosting operation of the outdoor heat exchanger, in a case in which a measurement value of the temperature sensor provided to the second flow passage is equal to or larger than the first predefined value while the rotating member takes the second angular position, when a period in which the rotating member takes the first angular position during the defrosting operation is not present, the controller is configured to determine the angular position of the rotating member to the first angular position, and when a period in which the rotating member takes the first angular position during the defrosting operation is present, the controller is configured to determine the angular position of the rotating member to the third angular position.

9. The air-conditioning apparatus of claim 8, further comprising a flow switching device provided on a discharge side of the compressor, and configured to switch a flow passage to one of a third flow passage connecting the discharge side of the compressor and the indoor heat exchanger to each other and a fourth flow passage connecting the discharge side of the compressor and the outdoor heat exchanger to each other, wherein the controller is configured to determine the flow passage of the flow switching device to one of the third flow passage and the fourth flow passage, to switch the flow passage of the flow switching device to one of the third flow passage and the fourth flow passage, corresponding to a determination result of the controller, and wherein, when the defrosting operation is started, the controller is configured to first determine the flow passage of the flow switching device to the third flow passage, and wherein, in a case in which the measurement value of the temperature sensor is smaller than the first predefined value even after elapse of a predefined time period from a start of the defrosting operation, the controller is configured to determine the flow passage of the flow switching device to the fourth flow passage.

10. The air-conditioning apparatus of claim 7, further comprising:

a merging portion provided between the outdoor heat exchanger and the suction side of the compressor, and configured to allow the first flow passage and the second flow passage to merge with each other; and a temperature sensor provided to the merging portion, wherein, during the defrosting operation of the outdoor heat exchanger, in a case in which a measurement value of the temperature sensor is equal to or larger than a first predefined value while the rotating member takes the first angular position, when a period in which the rotating member takes the second angular position during the defrosting operation is not present, the controller is configured to determine the angular position of the rotating member to the second angular position, and when a period in which the rotating member takes the second angular position during the defrosting operation is present, the controller is configured to determine the angular position of the rotating member to the third angular position, and wherein, during the defrosting operation of the outdoor heat exchanger, in a case in which the measurement value of the temperature sensor is equal to or larger than the first predefined value while the rotating member takes the second angular position, when a period in which the rotating member takes the first angular position during the defrosting operation is not present, the controller is configured to determine the angular position of the rotating member to the first angular position, and when a period in which the rotating member takes the first angular position during the defrosting operation is present, the controller is configured to determine the angular position of the rotating member to the third angular position.

11. The air-conditioning apparatus of claim 7, further comprising:

a second temperature sensor configured to measure a temperature of outside air; and an on-off valve provided in the bypass circuit, and configured to open and close a flow passage of the bypass circuit, wherein the controller is configured to determine an open state and a closed state of the on-off valve, and to control opening and closing of the on-off valve corresponding to a determination result of the controller, and wherein, when the defrosting operation of the outdoor heat exchanger is started, in a case in which a measurement value of the second temperature sensor is larger than a second predefined value, the controller is configured to determine the on-off valve to the closed state, and in a case in which the measurement value of the second temperature sensor is equal to or smaller than the second predefined value, the controller is configured to determine the on-off valve to the open state.

12. The air-conditioning apparatus of claim 1, wherein, when the compressor is activated, refrigerant passing through the bypass circuit and flowing into the switching valve flows into the outdoor heat exchanger.

13. The air-conditioning apparatus of claim 1, further comprising:

an accumulator provided between the outdoor heat exchanger and the suction side of the compressor, and configured to accumulate refrigerant flowing out from the outdoor heat exchanger; and a second bypass circuit having a first end connected to the switching valve and a second end connected to the accumulator, wherein, when the compressor is activated, refrigerant passing through the bypass circuit and flowing into the switching valve flows into the accumulator.

14. An air-conditioning apparatus comprising:

a refrigeration cycle circuit including a compressor, an indoor heat exchanger configured to serve as a condenser, an expansion valve, and an outdoor heat exchanger configured to serve as an evaporator;

a switching valve provided between the expansion valve and the outdoor heat exchanger; and a bypass circuit having a first end and a second end,
the first end being connected between the compressor and the indoor heat exchanger,
the second end being connected to the switching valve, the outdoor heat exchanger including a first flow passage and a second flow passage connected in parallel between the expansion valve and a suction side of the compressor, the switching valve including
- a body,
- a rotating member,
- a first inlet provided to the rotating member, and communicating with the expansion valve,
- a second inlet provided to the body, and communicating with the second end of the bypass circuit,
- a first outlet provided to the body, and communicating with the first flow passage, and
- a second outlet provided to the body, and communicating with the second flow passage, the rotating member being rotatable between a plurality of angular positions, the plurality of angular positions including
- a first angular position allowing the first inlet to communicate with the second outlet, and allowing the second inlet to communicate with the first outlet,
- a second angular position allowing the first inlet to communicate with the first outlet, and allowing the second inlet to communicate with the second outlet, and
- a third angular position allowing the first inlet to communicate with both of the first outlet and the second outlet.

* * * * *